(12) United States Patent
Ikeda

(10) Patent No.: US 8,023,031 B2
(45) Date of Patent: Sep. 20, 2011

(54) IMAGE PICKUP APPARATUS WITH DISPLAY APPARATUS, AND DISPLAY CONTROL METHOD FOR DISPLAY APPARATUS

(75) Inventor: Hitoshi Ikeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 387 days.

(21) Appl. No.: 11/672,069

(22) Filed: Feb. 7, 2007

(65) Prior Publication Data

US 2007/0188647 A1 Aug. 16, 2007

(30) Foreign Application Priority Data

Feb. 15, 2006 (JP) ................................ 2006-038481

(51) Int. Cl.
H04N 5/222 (2006.01)
(52) U.S. Cl. .................................. 348/333.04
(58) Field of Classification Search ............. 348/333.11, 348/333.02; 396/299, 287, 297
See application file for complete search history.

(56) References Cited

U.S. PATENT DOCUMENTS

| | | | |
|---|---|---|---|
| 6,504,575 B1 | 1/2003 | Ramirez et al. | |
| 7,301,662 B2 * | 11/2007 | Mifune ..................... | 358/1.15 |
| 7,319,490 B2 | 1/2008 | Kanamori et al. | |
| 2001/0026263 A1* | 10/2001 | Kanamori et al. ........... | 345/156 |
| 2001/0026683 A1 | 10/2001 | Morimoto et al. | |
| 2002/0030754 A1* | 3/2002 | Sugimoto ................ | 348/333.02 |
| 2005/0216862 A1* | 9/2005 | Shinohara et al. ........... | 715/825 |
| 2006/0045514 A1* | 3/2006 | Matsushita et al. ........... | 396/299 |
| 2006/0092306 A1* | 5/2006 | Kim ......................... | 348/333.01 |
| 2006/0114335 A1* | 6/2006 | Hara et al. ................. | 348/223.1 |
| 2007/0052821 A1* | 3/2007 | Fukui ........................... | 348/234 |
| 2008/0040693 A1* | 2/2008 | Toyama et al. ............... | 715/865 |
| 2009/0225179 A1* | 9/2009 | Ohashi et al. .............. | 348/222.1 |

FOREIGN PATENT DOCUMENTS

| | | |
|---|---|---|
| EP | 1 246 464 | 10/2002 |
| EP | 1 309 158 | 5/2003 |
| EP | 1 398 959 | 3/2004 |
| JP | 09-233375 A | 9/1997 |
| JP | 11-331647 A | 11/1999 |
| JP | 2001-325056 A | 11/2001 |
| WO | WO 92/08285 | 5/1992 |

OTHER PUBLICATIONS

PowerShot S500/410, Digital IXUS 500/430, Camera User Guide, p. 16.

The above references were cited in a Mar. 31, 2008 Japanese Office Action issued in the counterpart Japanese Patent Application 2006-038481.

The above reference was cited in a Apr. 8, 2011 European Office Action of which is enclosed of the counterpart European Patent Application No. 07001651.4.

* cited by examiner

Primary Examiner — Sinh Tran
Assistant Examiner — Jason Flohre
(74) Attorney, Agent, or Firm — Cowan, Liebowitz & Latman, P.C.

(57) ABSTRACT

In an image pickup apparatus having a display unit that displays an image, an operation member to which a plurality of functions are assigned, and a detection unit that detects touching to the operation member, a display control for the display unit judges with use of the detection unit whether the operation member is touched, and controls, if touching to the operation member is detected, to display on the display unit the functions assigned to the operation member in an operational state of the image pickup apparatus when the touching to the operation member is detected.

12 Claims, 20 Drawing Sheets

F I G. 7A
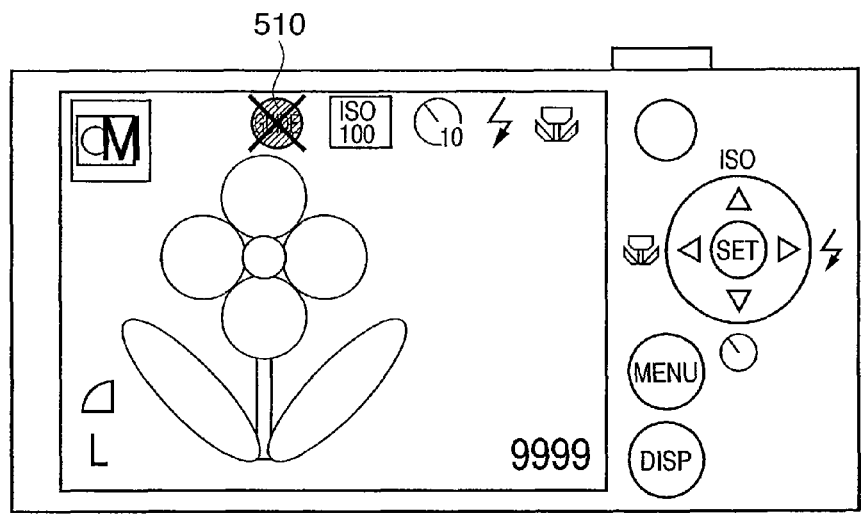
F I G. 7B
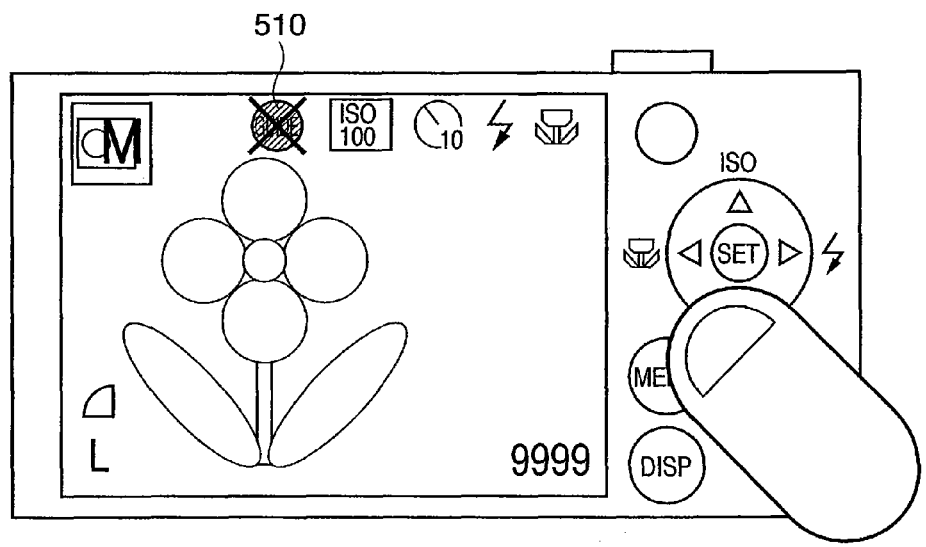

601

IMAGE PICKUP APPARATUS WITH DISPLAY APPARATUS, AND DISPLAY CONTROL METHOD FOR DISPLAY APPARATUS

BACKGROUND OF THE INVENTION

1. Field of the Invention

The present invention relates to an image pickup apparatus provided with a display apparatus that displays captured images, and a display control method for the display apparatus.

2. Description of the Related Art

Conventionally, many image pickup apparatuses such as digital cameras assign a plurality of functions to each operation member according to the situation and the operational state of modes, in order to realize a large number of functions with a limited number of operation members. For example, forwarding and rewinding of playback images in playback mode and flash and macro settings in shooting mode may be assigned to a cross key. It is common in this case for function names or illustrations expressing the functions to be printed on or around the operation members, so as to make it easy for the user to tell what functions are assigned to the operation members (e.g., see PowerShot S500/410, DIGITAL IXUS 500/430, Camera User Guide, p.16).

However, with conventional digital cameras, the function names or illustrations expressing the functions printed on or around an operation member sometimes get hidden by user's fingers when holding the camera, making it difficult to tell what functions are assigned to the operation member.

SUMMARY OF THE INVENTION

The present invention has been made in consideration of the above situation, and has as its object to make it possible to tell what functions are assigned to an operation member, even when function names or illustrations expressing the functions printed on or around the operation member are hidden from view.

According to the present invention, the foregoing object is attained by providing an image pickup apparatus comprising:

a display unit that displays an image;

an operation member to which a plurality of functions have been assigned;

a detection unit that detects touching to the operation member; and a controller that controls, if touching to the operation member is detected by the detection unit, to display on the display unit the functions assigned to the operation member in an operational state of the image pickup apparatus when the touching to the operation member is detected.

According to the present invention, the foregoing object is also attained by providing a display control method in an image pickup apparatus that has a display unit that displays an image, an operation member to which a plurality of functions are assigned, and a detection unit that detects touching to the operation member, the display control method being for the display unit, and comprising the steps of:

judging with use of the detection unit whether the operation member is touched; and displaying on the display unit, if touching to the operation member is detected, the functions assigned to the operation member in an operational state of the image pickup apparatus when the touching to the operation member is detected.

Further features of the present invention will become apparent from the following description of exemplary embodiments with reference to the attached drawings.

BRIEF DESCRIPTION OF THE DRAWINGS

FIGS. 7A and 7B illustrate guidance display according to the first embodiment of the present invention;

DESCRIPTION OF THE EMBODIMENTS

Preferred embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

Figure 1:
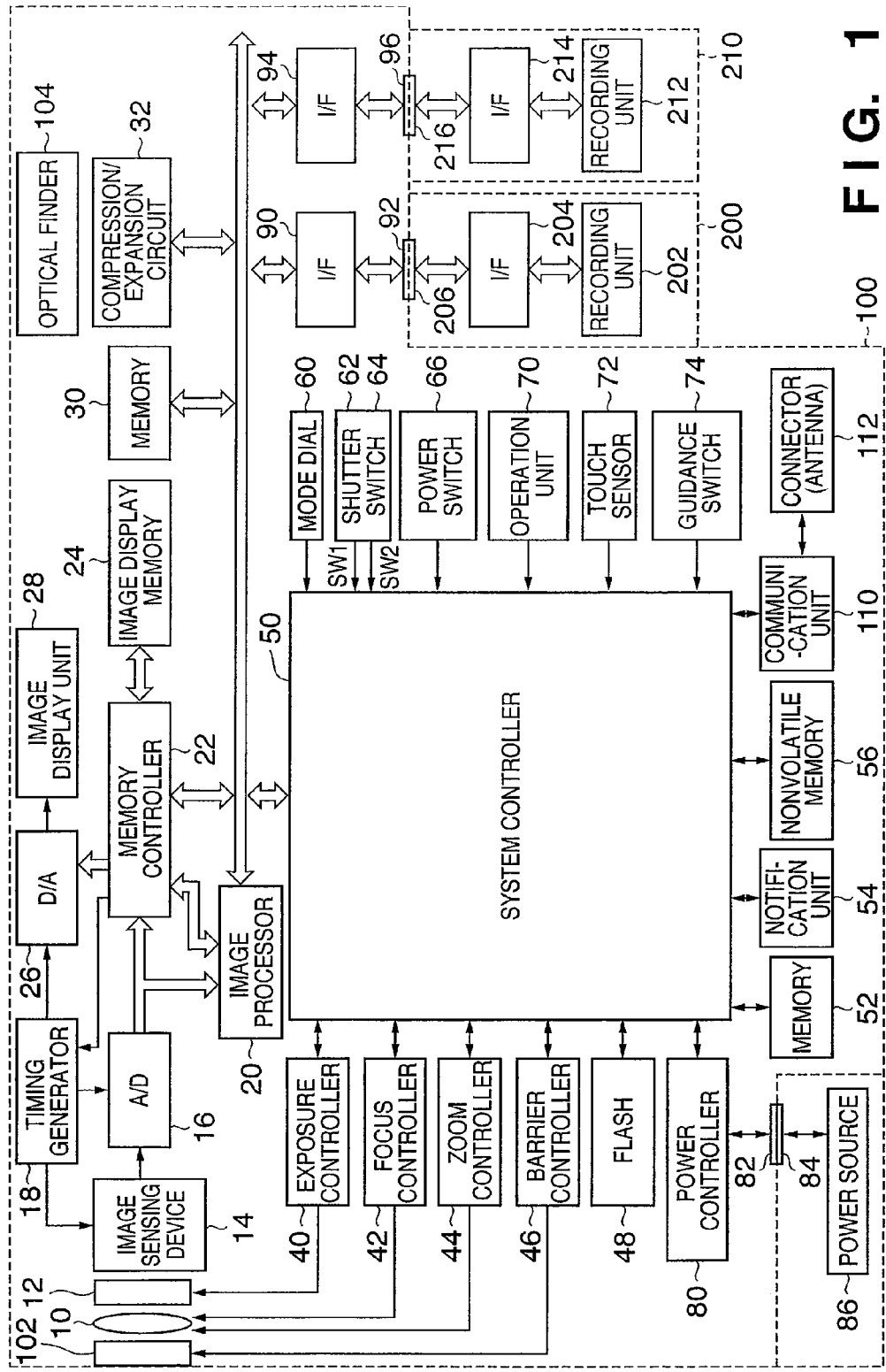
FIG. 1 is a block diagram showing the configuration of an image pickup apparatus according to embodiments of the present invention.

FIG. 1 is a block diagram showing a configuration of an image pickup apparatus having a image processing function according to an embodiment of the present invention. The image pickup apparatus may be any of a digital camera, a digital video camera, a mobile terminal equipped with a camera (including a mobile phone with a camera), and other devices capable of converting an optical image of a photographic subject into electrical signals and outputting them.

In FIG. 1, reference numeral 100 denotes an image pickup apparatus. Reference numeral 10 denotes an image sensing lens; 12, a shutter having a diaphragm function; 14, an image sensing device which converts an optical image into an electric signal; 16, an A/D converter which converts an analog signal output from the image sensing device 14 into a digital signal; and 18, a timing generator which supplies a clock signal and a control signal respectively to the image sensing device 14, the A/D converter 16 and a D/A converter 26, under the control of a memory controller 22 and a system controller 50.

Reference numeral 20 denotes an image processor which performs predetermined pixel interpolation processing, color conversion processing and the like on image data from the A/D converter 16 or image data from the memory controller 22. The image processor 20 performs predetermined calculation processing using the image data outputted from the A/D converter 16, and the system controller 50 performs through-the-lens (TTL) auto focus (AF) processing, auto exposure (AE) processing, pre-flash (EF) processing with respect to an exposure controller 40 and a focus controller 42, based on the result of calculations. Further, the image processor 20 performs predetermined calculation using the image data outputted from the A/D converter 16, and performs TTL auto white balance (AWB) processing, based on the result of calculations.

The memory controller 22 controls the A/D converter 16, the timing generator 18, the image processor 20, an image display memory 24, the D/A converter 26, a memory 30 and a compression/expansion circuit 32. The image data outputted from the A/D converter 16 is written into the image display memory 24 or the memory 30 via the image processor 20 and the memory controller 22, or only via the memory controller 22.

Reference numeral 24 denotes an image display memory; 26, the D/A converter; and 28, an image display unit comprising an LCD (Liquid Crystal Display) or the like. Image data written into the image display memory 24 is displayed on the image display unit 28 via the D/A converter 26. An electronic view finder function is realized by sequentially displaying obtained images on the image display unit 28. Further, the image display unit 28 arbitrarily turns ON/OFF its display, in accordance with an instruction from the system controller 50. If the display is turned OFF, the electric consumption of the image pickup apparatus 100 can be greatly reduced.

The memory 30, used for storing obtained still images and moving images, has a sufficient storage capacity for storing a predetermined number of still images and a moving image for a predetermined period. In sequential image sensing to sequentially obtain a plural number of still images or panoramic images sensing, a large amount of image data can be written into the memory 30 at a high speed. Further, the memory 30 may be used as a work area for the system controller 50.

The compression/expansion circuit 32 compresses or expands image data by known compression method, such as adaptive discrete cosine transformation (ADCT) or the like. The compression/expansion circuit 32 reads image data stored in the memory 30 and performs compression or expansion processing on the read image data, and writes the processed data into the memory 30.

The exposure controller 40 controls the shutter 12 having the diaphragm function. The exposure controller 40 interlocked with a flash 48 also has a flash adjusting function. The focus controller 42 controls focusing of the image sensing lens 10. Reference numeral 44 denotes a zoom controller which controls zooming of the image sensing lens 10. Reference numeral 46 denotes a barrier controller which controls the operation of a barrier 102 to protect the lens. The flash 48 has an AF auxiliary light projection function and a flash adjusting function. The system controller 50 controls the exposure controller 40 and the focus controller 42 by the TTL method, in accordance with the result of calculations by the image processor 20 based on the image data from the A/D converter 16.

The system controller 50 controls the overall image pickup apparatus 100. Memory 52 stores the constants, variables, and programs for operation of the system controller 50.

Reference numeral 54 denotes a notification unit which notifies operational states, messages and the like to the outside by using characters, images, sound and the like, in correspondence with execution of program by the system controller 50. The notification unit 54 comprises one or more combinations of display devices including an LCD and an LED for visual notification and sound generating devices for audio notification. Especially, the display device or devices is/are provided in a single or plural visually-recognizable positions around an operation unit 70 of the image pickup apparatus 100. Further, a part of functions of the notification unit 54 is provided within an optical finder 104.

The display contents of the notification unit 54, displayed on the LCD or the like, include: indication relating to shooting mode, such as single shot/sequential image sensing, and a self timer; indication relating to recording, such as a compression rate, the number of recording pixels, the number of recorded images, and the number of recordable images; and indication relating to image sensing conditions, such as a shutter speed, an f number (aperture), exposure compensation, flash illumination, red-eye effect mitigation; and indication of macro image sensing, a buzzer-set state, a timer battery level, a battery level, an error state, information of plural digit numbers, attached/detached status of recording media 200 and 210, operation of communication I/F, and date and time.

Further, the display contents of the notification unit 54, displayed within the optical finder 104, include a focus state, a camera shake warning, a flash charge state, the shutter speed, the f number (aperture), and the exposure compensation.

Reference numeral 56 denotes an electrically erasable and recordable nonvolatile memory such as an EEPROM.

Reference numerals 60, 62, 64 and 70 denote operation means for inputting various operation instructions to the system controller 50, comprising a single or plurality of combinations of switches, dials, touch panels, a device for pointing by line-of-sight detection, a voice recognition device, and the like.

Next, the operation means will be described in more detail.

Reference numeral 60 denotes a mode dial switch for selecting various function modes such as automatic shooting mode, program shooting mode, panoramic shooting mode, playback mode, multi-image playback/deletion mode, and PC connection mode.

Reference numeral 62 denotes a shutter switch SW1 turned ON by the first stroke (e.g., half stroke) of a shutter button (not shown), to instruct start of the operations of the AF processing, the AE processing, the AWB processing, the EF processing and the like.

Reference numeral 64 denotes a shutter switch SW2 turned ON by the second stroke (e.g., full stroke) of the shutter button (not shown), to instruct start of a series of operations of exposure processing to write a signal read from the image sensing device 14 into the memory 30, via the A/D converter 16 and the memory controller 22, development processing by using calculations by the image processor 20 and the memory controller 22, and recording processing to read the image data from the memory 30, compress the image data by the compression/expansion circuit 32, and write the compressed image data into the recording medium 200 or 210.

Reference numeral 66 denotes a power switch for setting ON/OFF of the power.

Reference numeral 70 denotes an operation unit comprising various buttons and touch panels including a menu button, a set button, a macro/non-macro selection button, a multi-image playback/repaging button, a flash button, a single-shot/sequential/self-timer image sensing selection button, a forward (+) menu item selection button, a backward (−) menu item selection button, a forward (+) playback image search button, a backward (−) playback image search button, an image sensing quality selection button, an exposure correction button, and a date/time set button. With a rotary dial switch, numerical values and functions can be more easily selected for the "+" and "−" buttons.

Reference numeral 72 denotes a touch sensor which detects touching to operation member by a finger/fingers, in combination with the operation members of the operation unit 70. According to this embodiment, upon detection of touching to an operation member by a finger/fingers using the touch sensor 72, guidance display of functions assigned to the operation member is displayed on the image display unit 28 or the notification unit 54, thereby helping user operation and improving the operability.

According to this embodiment, the operation member capable of detecting touching of finger/fingers using the touch sensor 72 is configured as a cross key. In shooting mode, up, down, right and left buttons are assigned to ISO speed setting, single shot/sequential shot/self timer setting, flash mode setting, macro/infinity setting, respectively. In playback mode, up, down, right and left buttons are assigned to jump, erase and forwarding of playback images, respectively. It should be noted that above assignment of functions is an example, and it is possible to assign other functions to the cross key, and/or configure the operation member capable of detecting touching of finger/fingers using the touch sensor 72 as other buttons.

Reference numeral 74 denotes a guidance switch for switching and setting ON/OFF (display/non-display) of guidance display when touching to the operation member by a finger/fingers is detected using the touch sensor 72. The system controller 50 changes the status of a guidance display setting flag stored in the internal memory of the system controller 50 or the memory 52, thereby controlling ON/OFF of the guidance display. It should be noted that the guidance switch 74 is used to change ON/OFF of the guidance display, however, it is also possible to change ON/OFF of the guidance display using a setting menu called in response to pressing of a menu button.

Reference numeral 80 denotes a power controller comprising a battery detection circuit, a DC-DC converter, a switch circuit to select the block to be energized and the like. The power controller 80 detects the attached/detached state of the battery, the battery type and the remaining battery power level, controls the DC-DC converter based on the results of detection and an instruction from the system controller 50, and supplies a necessary voltage to the respective parts including the recording medium for the necessary period.

Reference numerals 82 and 84 denote connectors; and 86, the power source comprising a primary battery such as an alkaline battery or a lithium battery, a secondary battery such as an NiDd battery, an NiMH battery, an Li-ion battery, or an Li polymer battery, an AC adapter, or the like.

Reference numerals 90 and 94 denote interfaces for recording media such as a memory card or a hard disk; and 92 and 96, connectors for connection with the recording media such as a memory card or a hard disk.

In the present embodiment, two systems of interfaces and connectors for connection with the recording media are employed. However, the number of systems is not limited, and a single or plurality of systems of interfaces and connectors may be provided. Further, interfaces and connectors pursuant to different standards may be combined.

As the interfaces and connectors, those in conformity with Personal Computer Memory Card International Association standards (PCMCIA cards), those in conformity with compact flash (CF) (registered trademark) card standards and SD cards may be used. In a case where interfaces and connectors in conformity with the PCMCIA cards, CF (registered trademark) cards, SD cards, and the like are used as the interfaces 90 and 94 and the connectors 92 and 96, various communication cards may be connected. Examples of communication cards include LAN cards, modem cards, Universal Serial Bus (USB) cards, Institute of Electrical and Electronic Engineers (IEEE) 1394 cards, P1284 cards, Small computer System Interface (SCSI) cards, PHS cards, and the like. Image data and management information attached to the image data are transmitted/received with respect to other peripheral devices such as a computer and a printer by connection with the above various communication cards.

The barrier 102 covers the image sensing portion of the image pickup apparatus 100 including the lens 10, thus prevents dirt and breakage of the image sensing portion.

The optical finder 104 can be used for image sensing without the electronic view finder function by the image display unit 28. In the optical finder 104, realized are some of the functions of the notification unit 54 including the indication of focus state, the camera shake warning, the flash charge state, the shutter speed, the f number (aperture), the exposure compensation and the like.

A communication unit 110 has various communication functions for RS232C, USB, IEEE 1394, P1284, SCSI, modem, LAN, and wireless communication.

A connector/antenna 112 functions as a connector when the image pickup apparatus 100 is connected to another device via the communication unit 110, and as an antenna for wireless communication.

The recording media 200 and 210 comprise memory cards, hard disks or the like. The recording media 200 and 210 have recording units 202 and 212 of a semiconductor memory, a magnetic disk or the like, the interfaces 204 and 214 for communication with the image pickup apparatus 100, and the connectors 206 and 216 for connection with the image pickup apparatus 100, respectively.

As the recording media 200 and 210, memory cards such as PCMCIA cards and CF (registered trademark) cards, and hard disks may be used. The recording media 200 and 210 may also configured with micro DAT, magneto-optical disks, optical disks such as CD-R and CD-WR, phase change optical disks such as DVD.

Further, in the above description, the shutter 12 is of a lens shutter type having a diaphragm function, however, a diaphragm and a shutter may be configured separately. Further, the shutter may be a focal-plane shutter.

Furthermore, in the above description, processing such as AE, AF and EF is performed on the basis of the signals from the image sensing device 14. However, a single-lens reflex type image pickup apparatus exposes an image sensing device only during the image sensing operation, thus an extra sensor is generally provided in addition to the image sensing device so that the processing such as AE, AF and EF is performed based on the signals from the extra sensor. The present invention is also applicable to such single-lens reflex type image pickup apparatus.

Further, the image pickup apparatus 100 may accommodate a single-focus lens which does not have zooming function. The barrier 102 may not be provided. Furthermore, the flash 48 may not be accommodated in the image pickup apparatus 100, and may be of detachable type.

First Embodiment

The operations of the image pickup apparatus 100 having the above configuration in the first embodiment are described next.

Figure 2:
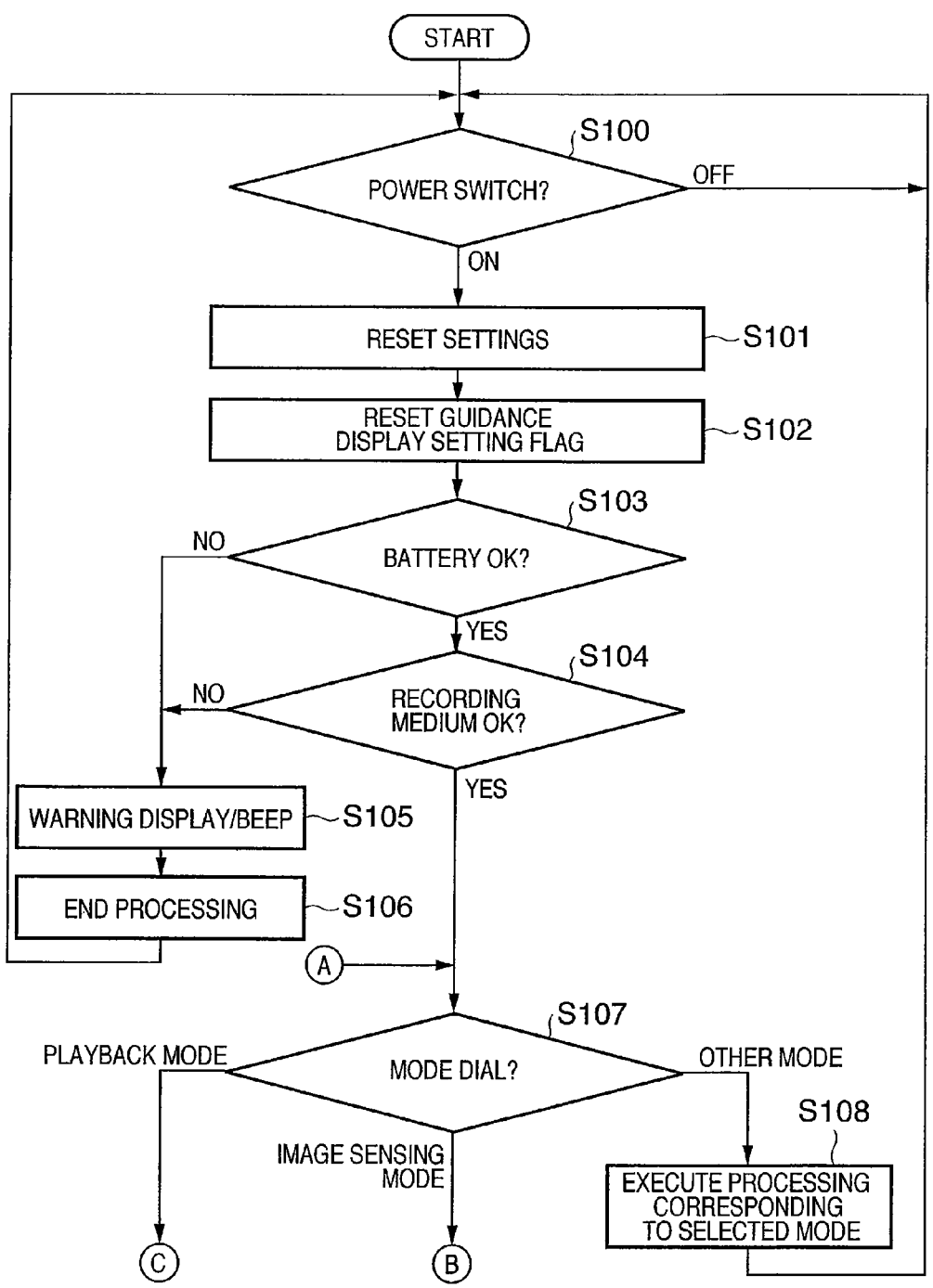
FIG. 2 is a flowchart showing part of the processing by the image pickup apparatus according to a first embodiment of the present invention.
Figure 3:
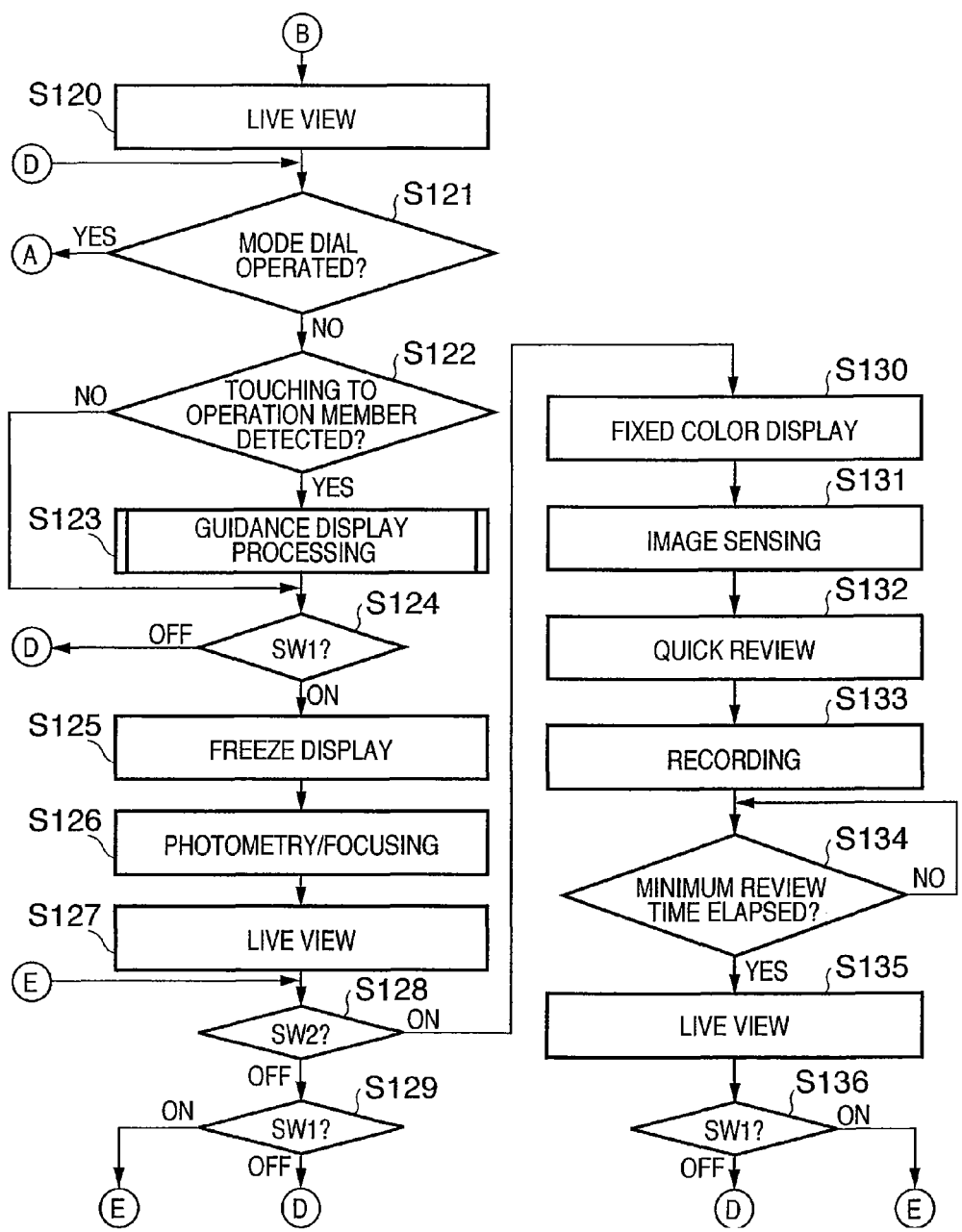
FIG. 3 is a flowchart showing part of the processing in shooting mode performed by the image pickup apparatus according to the first embodiment of the present invention.
Figure 4:
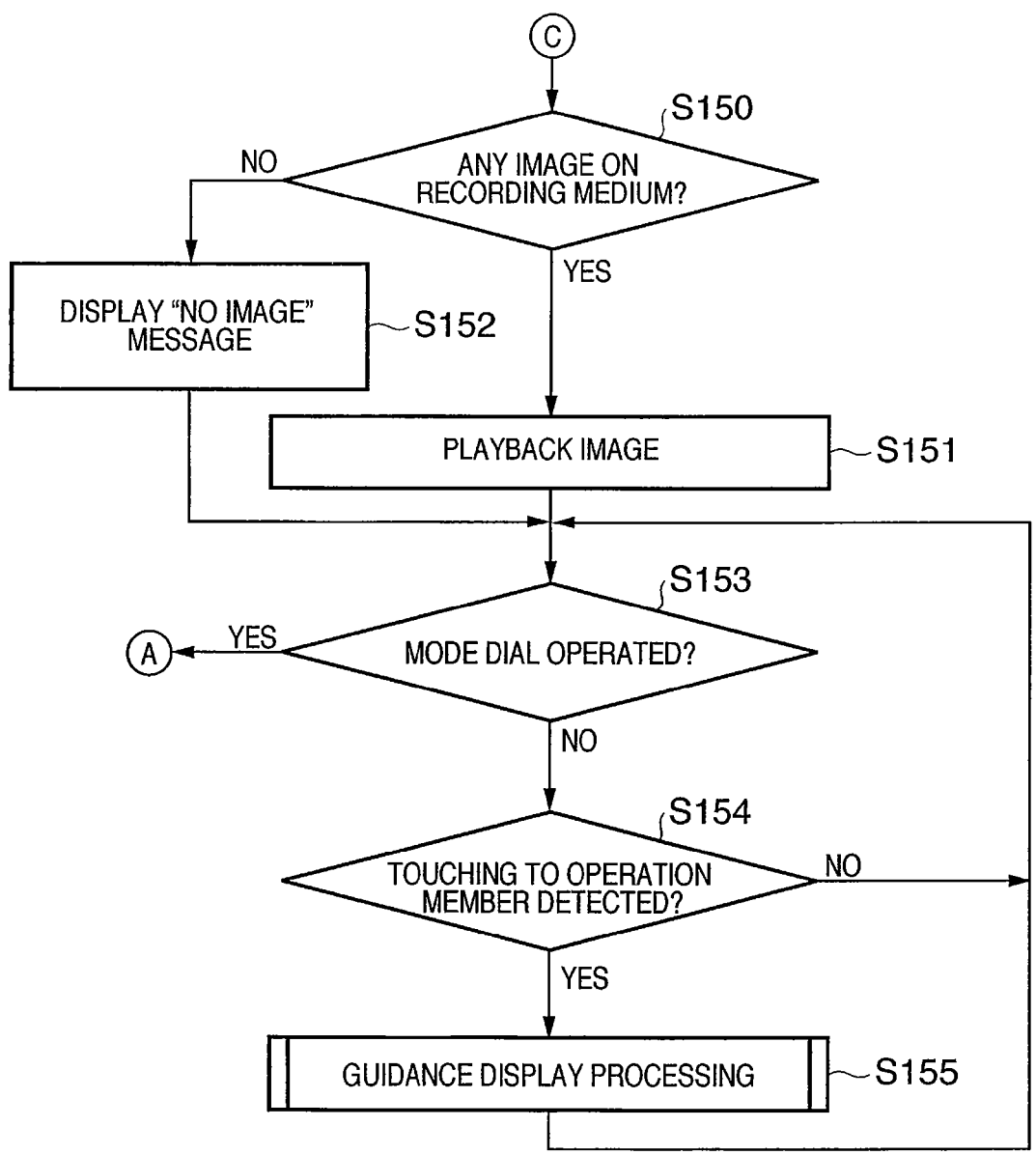
FIG. 4 is a flowchart showing part of the processing in playback mode performed by the image pickup apparatus according to the first embodiment of the present invention.

FIGS. 2 to 4 are flowcharts showing the operations of the image pickup apparatus 100 in the first embodiment.

Firstly, if the power switch 66 is set to power ON in step S100 of FIG. 2, the system controller 50 resets settings of the units of the image pickup apparatus 100, together with resetting flags, control variables and the like (step S101).

On the other hand, if the power switch 66 is set to power OFF in step S100, processing returns directly to step S100, and step S100 is repeated until the power switch 66 is set to power ON.

Next, the system controller 50 resets the guidance display setting flag (step S102), and proceeds to step S103. Note that the status of the guidance display setting flag is stored in the internal memory of the system controller 50 or the memory 52.

The guidance display setting flag is used in controlling the ON/OFF setting of guidance display. When finger contact with an operation member (the cross key in the present embodiment) configured by the touch sensor 72 is detected with the guidance display setting ON, guidance for the functions assigned to the cross key is displayed on the image display unit 28 or the notification unit 54. ON or OFF may be set as the default of the guidance display setting flag when power is turned ON, or the setting when power was last turned OFF may be recorded in the nonvolatile memory 56, and this value may be read and set as the initial value of the guidance display setting flag. Guidance display is described in detail later.

In step S103, the system controller 50 causes the power controller 80 to check whether the remaining capacity or operation status of the power source 86 formed from a battery or the like inhibits the operation of the image pickup apparatus 100. If there is a problem (NO in step S103), a prescribed warning is issued using images and/or sound on the image display unit 28 or the notification unit 54 (step S105), and prescribed end processing is performed (step S106), after which processing returns to step S100. The end processing in step S106 involves changing the display on the image display unit 28 or the notification unit 54 to an end state. Further, the system controller 50 closes the barrier 102 to protect the image sensing unit, and records required parameters and set values including flags and control variables to the nonvolatile memory 56, together with set modes and the status of the guidance display setting flag. The system controller 50 also performs processing for blocking unnecessary power supply by the power controller 80 to the units of the image pickup apparatus 100 including the image display unit 28.

On the other hand, if there is not a problem with the power source 86 (YES in step S103), the system controller 50 checks whether the operation state of the recording medium 200 or 210 inhibits the operation of the image pickup apparatus 100, particularly image data recording/playback operation with respect to the recording medium. If there is a problem (NO in step S104), a prescribed warning is issued using images and/or sound on the image display unit 28 or the notification unit 54 (step S105), and after performing the prescribed end processing (step S106), processing returns to step S100.

If there is not a problem with the operational state of the recording medium 200 or 210 (YES in step S104), processing proceeds to step S107.

The setting of the mode dial 60 is confirmed at step S107. If the mode dial 60 is set to shooting mode, processing proceeds to step S120 in FIG. 3, and if set to playback mode, processing proceeds to step S150 in FIG. 4. If neither of these modes is set, corresponding processing is performed at step S108, after which processing returns to step S100.

The operations of the image pickup apparatus 100 when shooting mode has been set using the mode dial 60 are described next with reference to FIG. 3.

In shooting mode, the system controller 50 sets live view display for sequentially displaying sensed image data (step S120), and proceeds to step S121. With live view display, data sequentially written to the image display memory 24 via the image sensing device 14, the A/D converter 16, the image processor 20 and the memory controller 22 is sequentially displayed by the image display unit 28 via the memory controller 22 and the D/A converter 26. The electronic viewfinder function is thereby realized.

At step S121, the operational state of the mode dial 60 is confirmed, and if it is operated, processing returns to step S107 in FIG. 2. If the mode dial 60 is not operated (NO in step S121), processing proceeds to step S122.

If touching to the cross key is not detected (NO in step S122), processing proceeds directly to step S124. If touching to the cross key is detected (YES in step S122), guidance display processing is performed involving guidance for the functions assigned to the cross key being displayed on the image display unit 28 or the notification unit 54 (step S123), and processing proceeds to step S124. Guidance display processing is described in detail later using FIG. 5.

At step S124, it is judged whether the shutter switch SW1 is being pressed, and if it is not being pressed, processing returns to step S121. If the shutter switch SW1 is being pressed, the system controller 50 sets the image display unit 28 to freeze display (step S125), and proceeds to step S126.

With freeze display, rewriting of image data in the image display memory 24 via the image sensing device 14, the A/D converter 16, the image processor 20 and the memory controller 22 is inhibited. A still image is then displayed in the electronic viewfinder by displaying the latest image data in the image display memory 24 on the image display unit 28 via the memory controller 22 and the D/A converter 26.

In step S126, the system controller 50 performs focus control to focus the image sensing lens 10 on the photographic subject, and photometry to set aperture and shutter speed. The flash is also set during photometry if necessary.

Once focus control and photometry have been completed, the system controller 50 sets the image display unit 28 to live view display (step S127), and proceeds to step S128. Note that live view display at step S127 is the same operational state as live view display at step S120.

If the shutter switch SW2 is not pressed (OFF in step S128) and the shutter switch SW1 is still being pressed (ON in step S129), processing returns to step S128. If the shutter switch SW2 is not pressed (OFF in step S128) and the shutter switch SW1 has also been released (OFF in step S129), processing returns to step S121.

If the shutter switch SW2 is pressed (ON in step S128), the system controller 50 sets the image display unit 28 to fixed color display (step S130), and proceeds to step S131. With fixed color display, captured image data written to the image display memory 24 via the image sensing device 14, the A/D converter 16, the image processor 20 and the memory controller 22 is replaced by fixed color image data. Then the fixed color image data is displayed on the image display unit 28 via the memory controller 22 and the D/A converter 26, thereby a fixed color image is displayed in the electronic viewfinder.

Next, in step S131, the system controller 50 executes image sensing processing composed of exposure and development processing. In the exposure processing, a signal read from the image sensing device 14 is written as captured image data to the memory 30 via the A/D converter 16, the image processor 20 and the memory controller 22, or via the A/D converter 16 directly to the memory controller 22. In the development processing, various processing is performed on image data read from the memory 30, using the memory controller 22 and, if necessary, the image processor 20.

The system controller 50 then performs quick review display (step S132), which is followed by recording (step S133). With recording, captured image data is firstly read from the memory 30, and various image processing is performed using the memory controller 22 and, if necessary, the image processor 20. Image compression that depends to the set mode is also performed using the compression/expansion circuit 32. The compressed image data is then written to the recording medium 200 or 210.

If the prescribed minimum review time has not elapsed, step S134 is repeated until the prescribed minimum review time elapses, after which processing proceeds to step S135.

At step S135, the system controller 50 sets the image display unit 28 to live view display, and proceeds to step S136.

If the shutter switch SW1 is being pressed (ON in step S136), the system controller 50 returns to step S128 and prepares for the next image sensing operation. If the shutter switch SW1 is not being pressed (OFF in step S136), the system controller 50 ends the series of image sensing operations and returns to step S121.

The operations of the image pickup apparatus 100 when playback mode is set using the mode dial 60 are described next with reference to FIG. 4.

In playback mode, the system controller 50 checks whether any image file is recorded on the recording medium 200 or 210 (step S150). If one or more image files are recorded, the latest image is displayed on the image display unit 28 (step S151), and processing proceeds to step S153.

If no image file is recorded, a message such as "no image" conveying the fact that any image is not recorded on the recording medium is displayed on the image display unit 28 or the notification unit 54 (step S152), and processing proceeds to step S153.

At step S153, the operational state of the mode dial 60 is confirmed, and if it is operated, processing returns to step S107 in FIG. 2. If the mode dial 60 is not operated (NO in step S153), processing proceeds to step S154.

If touching to the cross key (not shown), which is one of the operation unit 70, is not detected (NO in step S154), processing returns to step S153 and is repeated. If touching to the cross key is detected (YES in step S154), guidance display processing is performed to display guidance for the functions assigned to the cross key on the image display unit 28 or the notification unit 54 (step S155), after which processing returns to step S153 and is repeated. Guidance display processing is described in detail below using FIG. 5.

Figure 5:
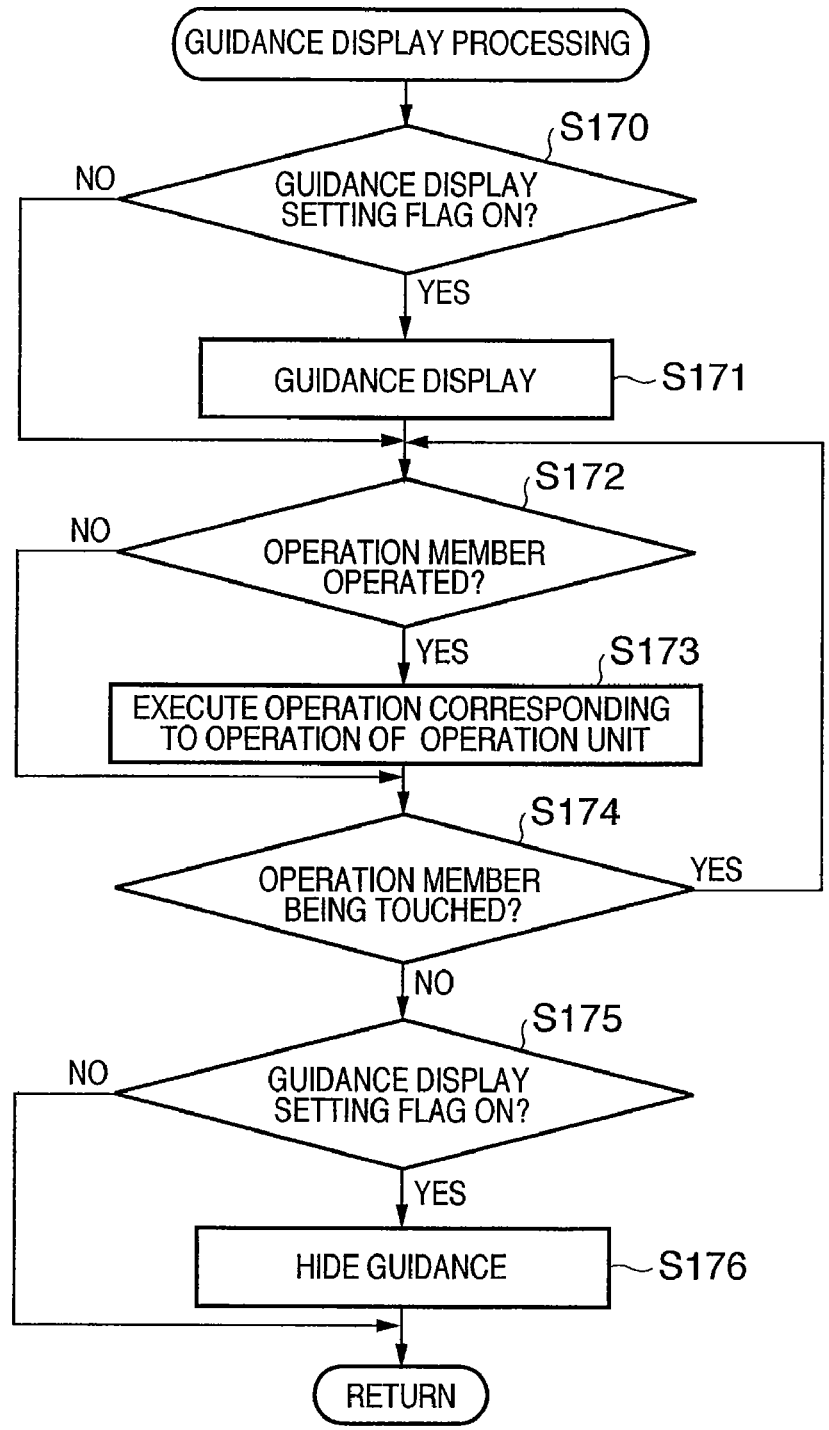
FIG. 5 is a flowchart showing a guidance display processing routine according to the first embodiment of the present invention.

FIG. 5 is a flowchart showing guidance display processing in the first embodiment, which is executed at step S123 in FIG. 3 and step S155 in FIG. 4.

The system controller 50 judges the status of the guidance display setting flag stored in the internal memory of the system controller 50 or the memory 52 (step S170), and if the guidance display setting flag is OFF, processing proceeds directly to step S172.

On the other hand, if the guidance display setting flag is ON, guidance for the functions assigned to the cross key is displayed on the image display unit 28 or the notification unit 54 (step S171).

In the first embodiment, icons showing the ISO speed, single shot/sequential shot/self-timer setting, flash mode setting and macro/infinity setting are displayed as guidance in shooting mode, while icons showing jump, erase and forwarding of playback images are displayed as guidance in playback mode. Exemplary guidance display is described later using FIGS. 6A to 6E.

Next, the system controller 50 checks whether the cross key is operated, and if NO in step S172, processing proceeds directly to step S174. If YES in step S172, an operation that corresponds to the operation of the cross key is executed (step S173), after which processing proceeds to step S174.

In the first embodiment, the ISO speed, single shot/sequential shot/self-timer setting, flash mode setting, or macro/infinity setting is changed in shooting mode, and jump, erase or forwarding of playback images is performed in playback mode, according to the operation input using the cross key.

If it is judged that the cross key is being touched due to continued touching to the cross key being detected (YES in step S174), processing returns to step S172.

If it is judged that the cross key is not being touched due to continued touching to the cross key not being detected (NO in step S174), processing proceeds to step S175.

At step S175, the system controller 50 judges the status of the guidance display setting flag stored in the internal memory of the system controller 50 or the memory 52 (step S175). If the guidance display setting flag is OFF, the guidance display processing of step S123 in FIG. 3 and step S155 in FIG. 4 is directly ended.

On the other hand, if the guidance display setting flag is ON, guidance being displayed on the image display unit 28 or the notification unit 54 is hidden (step S176), and the guidance display processing of step S123 in FIG. 3 and step S155 in FIG. 4 is ended.

FIGS. 6A to 6E show exemplary guidance display in the first embodiment. Note that although the ON/OFF state of the guidance display setting can be switched using the guidance switch 74 as mentioned previously with reference to FIG. 1, FIGS. 6A to 6E show an alternative setting example of using a settings menu which can be called by pressing a menu button.

Figure 6A:
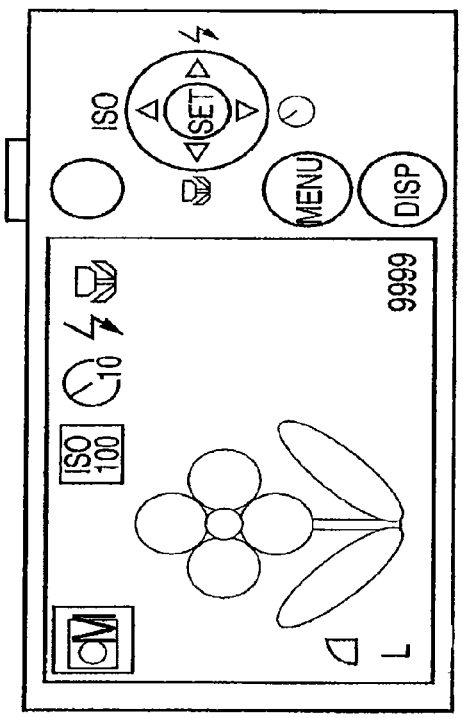
FIGS. 6A to 6E illustrate guidance display according to the first embodiment of the present invention.
Figure 6C:
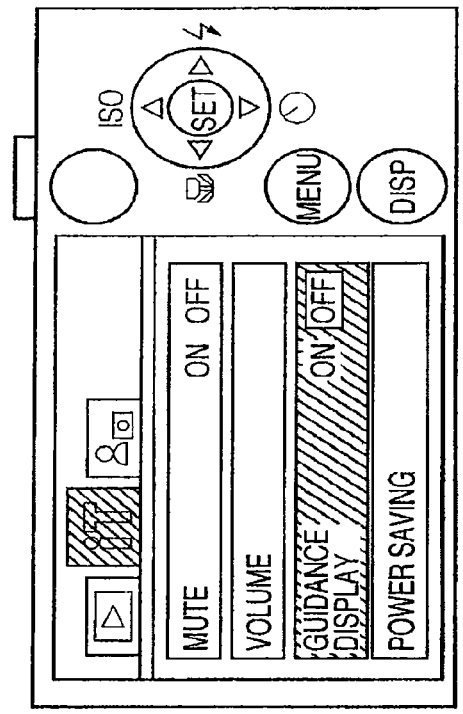
Figure 6B:
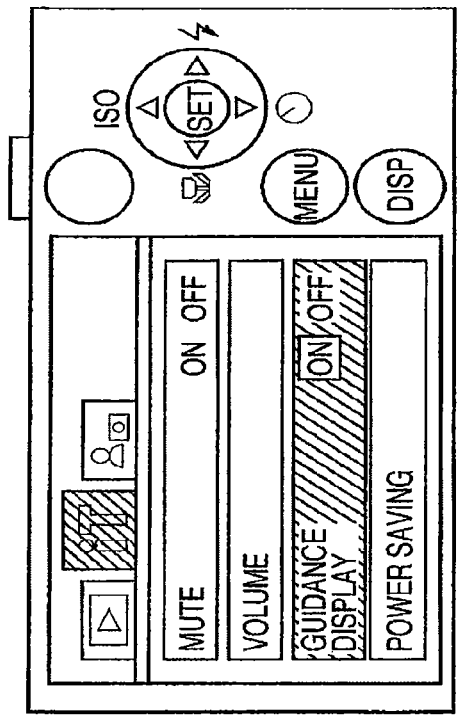

FIG. 6A shows the normal state in shooting mode. In this state, similar display is performed irrespective of the ON/OFF state of the guidance display setting. Guidance display can be set to ON/OFF in this state by pressing the menu button to display the settings menu, and selecting the guidance display item in the settings menu using the up/down keys. The guidance display setting screen depends on the current status of the guidance display setting flag, with the screen in FIG. 6B being displayed if the flag is ON, and the screen in FIG. 6C being displayed if the flag is OFF. The ON/OFF state of the guidance display setting can be switched with the left/right keys.

Figure 6E:
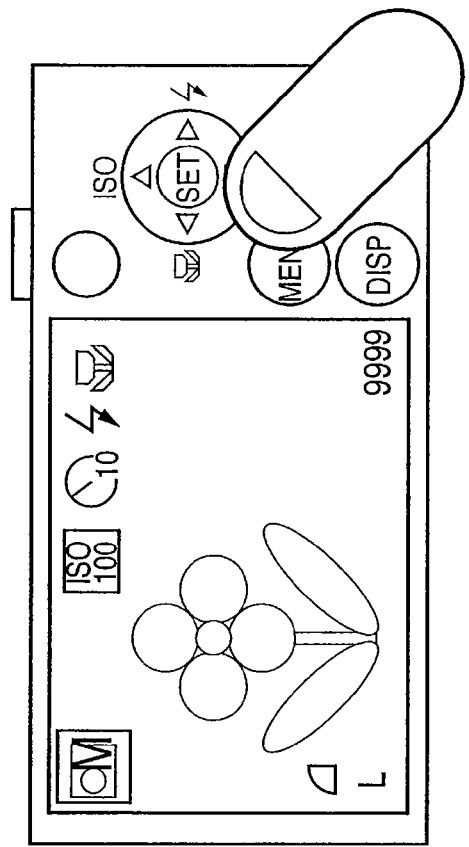
Figure 6D:
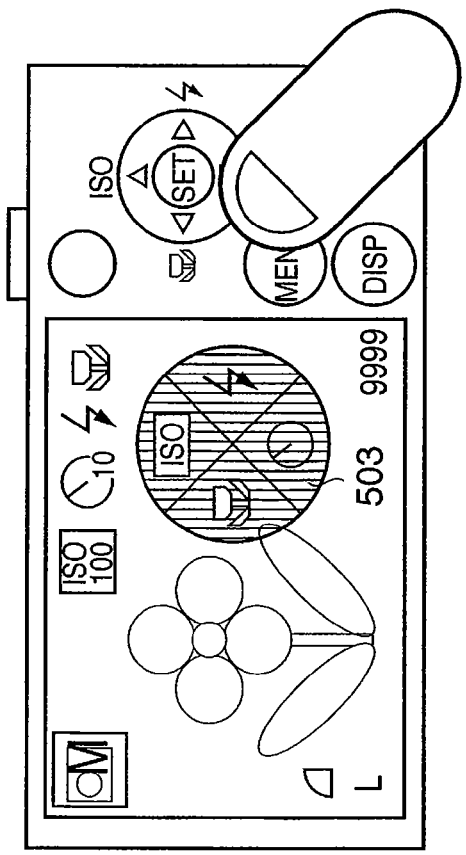

FIGS. 6D and 6E show what the screen looks like when the cross key is touched with the guidance display setting ON (FIG. 6B) and OFF (FIG. 6C), respectively.

If the guidance display setting is ON, icons 503 showing the ISO speed, single shot/sequential shot/self-timer setting, flash mode setting and macro/infinity setting assigned to the cross key are displayed as guidance when the cross key is touched in shooting mode (FIG. 6D). If the guidance display setting is OFF, the display is similar to the normal state, remaining unchanged even when the cross key is touched (FIG. 6E).

By displaying guidance in this way, the user can easily find out what functions are assigned to the cross key, thereby improving operability. Guidance display can also be easily set to OFF when not required, such as if the user is familiar with the operations with the operation unit 70.

FIGS. 7A and 7B show an alternative example of display screens for when the guidance display setting is OFF. In FIG. 6A, display is similar irrespective of the ON/OFF state of the guidance display setting. However, display may be as shown in FIG. 7A.

FIG. 7A shows the normal state when the guidance display setting is OFF, while FIG. 7B shows what the screen looks like when the cross key is touched when guidance display setting is OFF. With FIGS. 7A and 7B, displaying an icon 510 showing that the guidance display setting is OFF allows the user to quickly ascertain that guidance will not be displayed even if the cross key is touched because the guidance display setting is currently OFF. Note that when the guidance display setting is ON, an icon without the "X" of the icon 510 may be displayed or the icon 510 may be hidden.

Further improvement in usability can thereby be achieved by displaying screens such as FIGS. 7A and 7B, since the user is able to tell at a glance whether the guidance display setting is currently ON or OFF.

FIGS. 8A to 8D show further examples of display screens for when the guidance display setting is OFF. With the example shown in FIG. 6E, display is similar to the normal state, remaining unchanged even when the cross key is touched while the guidance display setting is OFF. However, display may be as shown in FIGS. 8A to 8D.

Figure 8A:
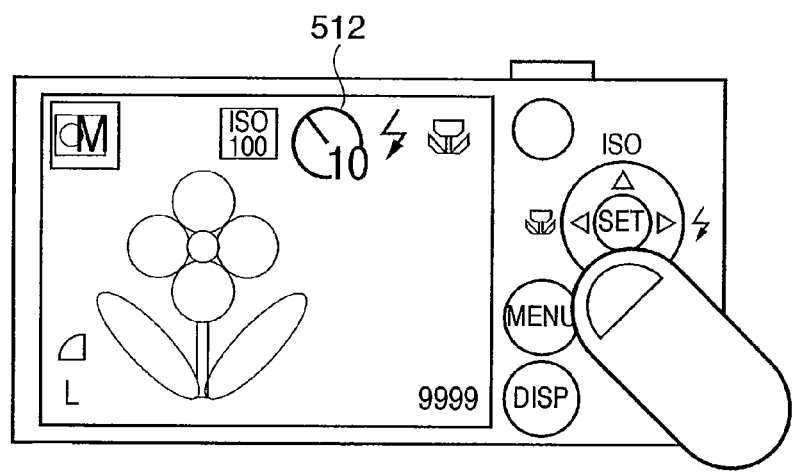
FIGS. 8A to 8D illustrate a further example of guidance display according to the first embodiment of the present invention.
Figure 8B:
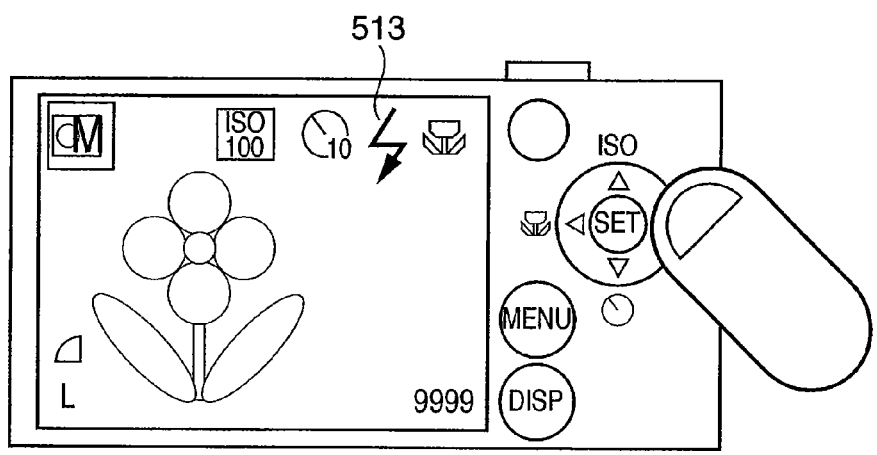
Figure 8C:
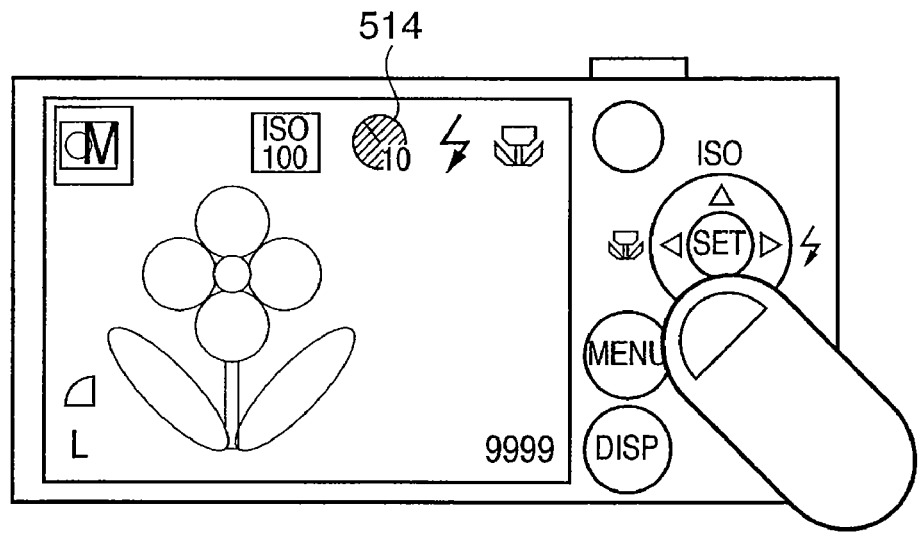
Figure 8D:
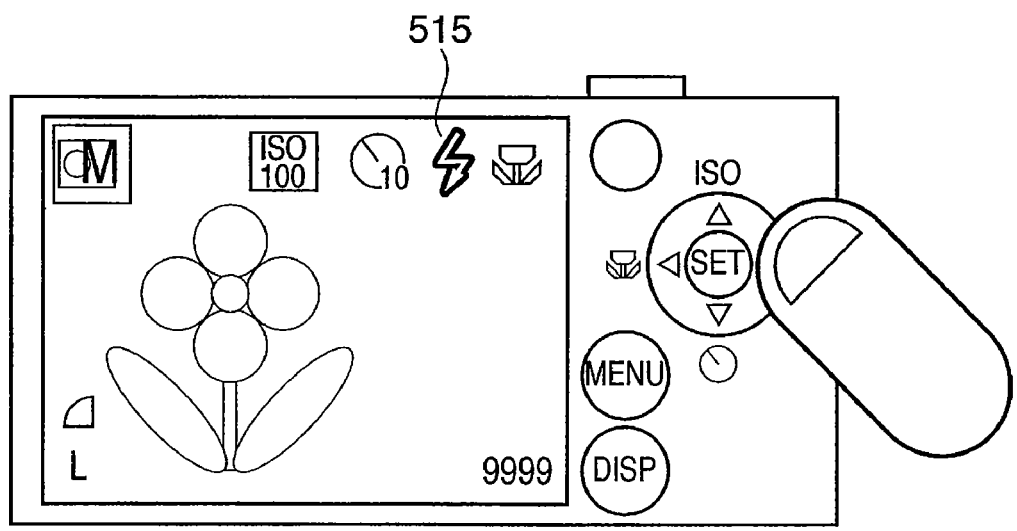

FIGS. 8A and 8C show the case where the down button (single shot/sequential shot/self-timer setting button) is touched when the guidance display setting is OFF, while FIGS. 8B and 8D show the case where the right button (flash mode setting button) is touched when the guidance display setting is OFF. FIGS. 8A and 8B show an example in which icons 512 and 513 corresponding to the touched buttons are displayed larger than the other icons. FIGS. 8C and 8D show an example in which icons 514 and 515 corresponding to the touched buttons are displayed with a different color from normal. By changing the manner of displaying icons in this way, further improvement in usability can be achieved, since the user is able to tell what function is assigned to the button being touched when the guidance display setting is OFF even if guidance is not displayed.

Second Embodiment

A second embodiment of the present invention is described next.

Figure 12:
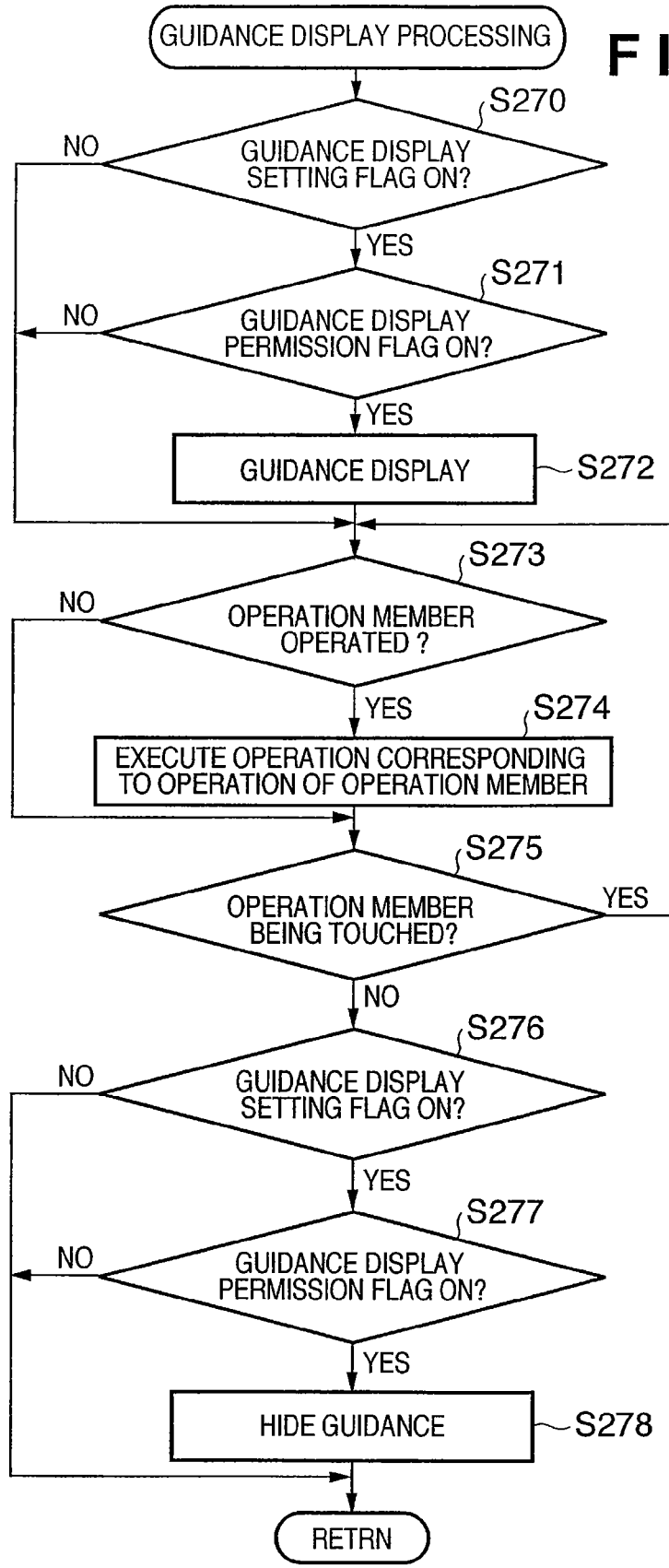
FIG. 12 is a flowchart showing a guidance display processing routine according to the second and third embodiments of the present invention.

In the second embodiment, touching to the cross key is monitored by processing independent of the image sensing processing and playback processing of the image pickup apparatus. An interrupt is generated when touching to the cross key is sensed, and guidance display processing described later with reference to FIG. 12 is performed. The main routine in the second embodiment is described firstly.

Figure 9:
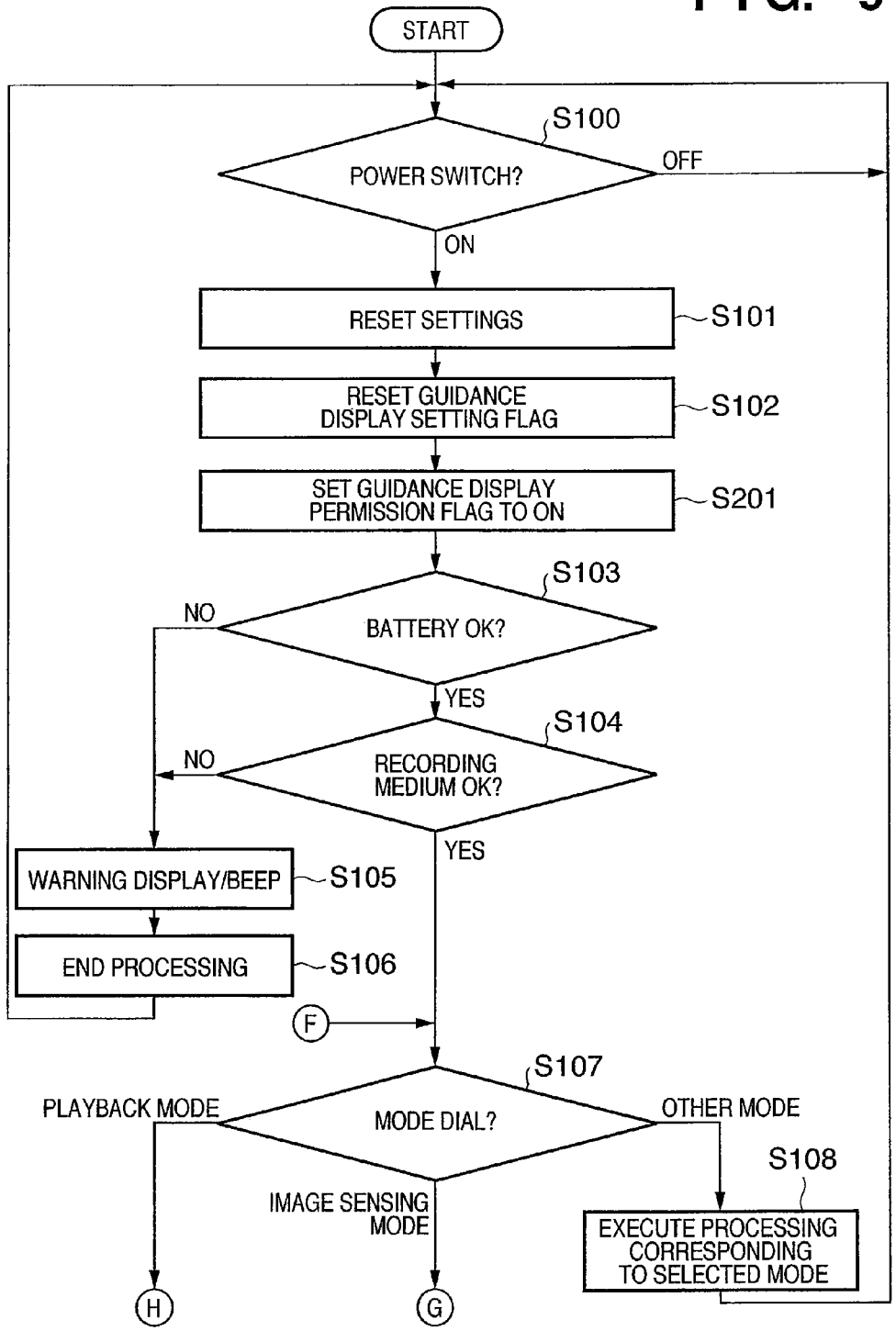
FIG. 9 is a flowchart showing part of the processing by the image pickup apparatus according to second and third embodiments of the present invention.
Figure 10:
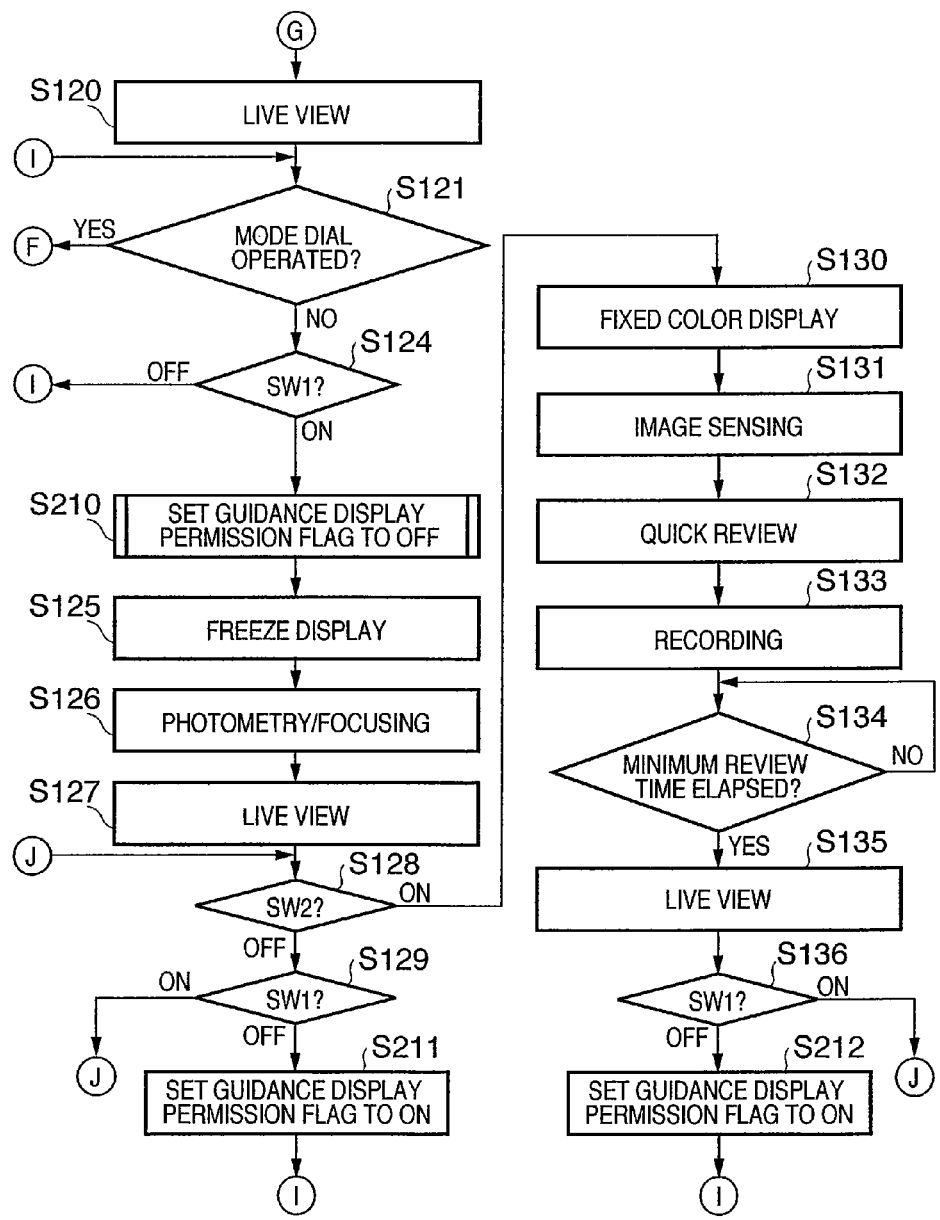
FIG. 10 is a flowchart showing part of the processing in shooting mode performed by the image pickup apparatus according to the second embodiment of the present invention.
Figure 11:
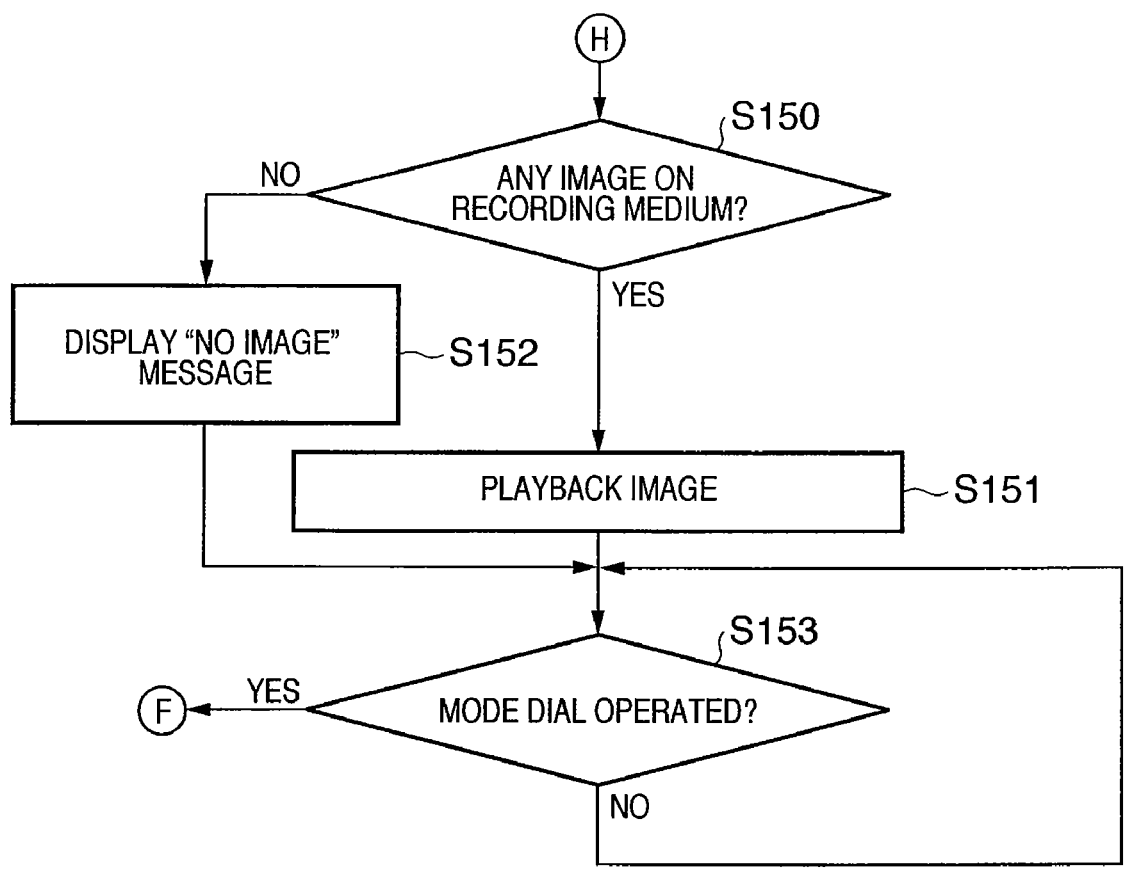
FIG. 11 is a flowchart showing part of the processing in playback mode performed by the image pickup apparatus according to the second embodiment of the present invention.

FIGS. 9 to 11 are flowcharts showing the operations of the image pickup apparatus 100 in the second embodiment, with FIG. 9 including the addition of step S201 to the processing shown in FIG. 2. In the second embodiment, the system controller 50 at step S102 resets the guidance display setting flag (step S102), stores the status of the guidance display setting flag in the internal memory of the system controller 50 or the memory 52, and proceeds to step S201.

In step S201, the system controller 50 resets a guidance display permission flag to ON, and proceeds to step S103. Note that the status of the guidance display permission flag is stored in the internal memory of the system controller 50 or the memory 52. The guidance display permission flag is used for controlling whether to display guidance according to the situation, even when the guidance display setting is ON.

Since the processing other than step S201 is similar to processing described in FIG. 2, related description is omitted.

Processing in the second embodiment when the mode dial 60 is set to shooting mode at step S107 in FIG. 9 is described next with reference to FIG. 10. Note that the same reference numerals are appended to processing that is similar to FIG. 3, and related description is appropriately omitted.

In shooting mode, the system controller 50 sets live view display for sequentially displaying sensed image data (step S120), and proceeds to step S121. At step S121, the operational state of the mode dial 60 is confirmed, and if it is operated, processing returns to step S107 in FIG. 9. If the mode dial 60 is not operated (NO in step S121), processing proceeds to step S124. In the second embodiment, as mentioned previously, finger contact with the cross key is monitored by independent processing and an interrupt is generated, so the processing of steps S122 and S123 described in FIG. 3 is not performed.

In step S124, it is judged whether the shutter switch SW1 is being pressed, and if it is not being pressed, processing returns to step S121. If the shutter switch SW1 is being pressed, the system controller 50 sets the guidance display permission flag stored in the internal memory of the system controller 50 or the memory 52 to OFF (step S210), and proceeds to step S125.

The processing of steps S125 to S129 described in FIG. 3 is then performed, and if SW1 has been released at step S129 (OFF in step S129), processing proceeds to step S211. After resetting the guidance display permission flag stored in the internal memory of the system controller 50 or the memory 52 to ON at step S211, the system controller 50 returns to step S121.

On the other hand, if the shutter switch SW2 is pressed (ON in step S128), the system controller 50 performs the processing of steps S130 to S136 described in FIG. 3. If the shutter switch SW1 is not being pressed (OFF in step S136), processing then proceeds to step S212. After resetting the guidance display permission flag stored in the internal memory of the system controller 50 or the memory 52 to ON at step S212, the system controller 50 ends the series of image sensing operations and returns to step S121.

The guidance display permission flag is thereby set to OFF for the duration that the shutter switch SW1 is being pressed.

The operations of the image pickup apparatus 100 in the second embodiment when playback mode has been set using the mode dial 60 are described next with reference to FIG. 11.

In the second embodiment, as mentioned previously, touching to the cross key is monitored by independent processing and an interrupt is generated. Thus, in the processing of the second embodiment shown in FIG. 11, the processing of steps S154 and S155 in FIG. 4 is not performed. Since the remaining processing is similar to FIG. 4, the same reference numerals are appended, and related description is omitted.

Next, a detail flowchart of the guidance display processing in the second embodiment is shown in FIG. 12. This processing is executed by interrupting the above processing of FIGS. 9 to 11 when touching to the cross key is sensed.

When touching to the cross key is sensed, the system controller 50 judges the status of the guidance display setting flag stored in the internal memory of the system controller 50 or the memory 52 (step S270). If the guidance display setting flag is OFF, processing proceeds directly to step S273.

On the other hand, if the guidance display setting flag is ON, the system controller 50 judges the status of the guidance display permission flag stored in the internal memory of the system controller 50 or the memory 52 (step S271). If the guidance display permission flag is OFF, processing proceeds directly to step S273.

On the other hand, if the guidance display permission flag is ON, guidance for the functions assigned to the cross key are displayed on the image display unit 28 or the notification unit 54 (step S272). Note that the guidance display is similar to that described at step S171 of FIG. 5.

Performing controls in this way enables guidance display to be inhibited if the guidance display permission flag is OFF, even though the guidance display setting is ON. In the example described with reference to FIGS. 9 to 11, the guidance display permission flag is OFF for the duration that the shutter switch SW1 is being pressed. Guidance display can thus be inhibited even though the guidance display setting is ON, thereby enabling display that is irrelevant to image sensing operation to be prevented.

Next, the system controller 50 checks whether the cross key is operated in step S273, and if NO in step S273, processing proceeds directly to step S275. If YES in step S273, an operation that corresponds to the operation of the cross key is executed (step S274), after which processing proceeds to step S275. Note that the operation in step S274 is similar to the operation performed at step S173 in FIG. 5.

If it is judged that the cross key is being touched due to continued touching to the cross key being detected (YES in step S275), processing returns to step S273.

If it is judged that the cross key is not being touched due to continued touching to the cross key not being detected (NO in step S275), processing proceeds to step S276.

The system controller 50 judges the status of the guidance display setting flag stored in the internal memory of the system controller 50 or the memory 52 (step S276), and if the guidance display setting flag is OFF, the guidance display processing is directly ended.

If the guidance display setting flag is ON, the system controller 50 judges the status of the guidance display permission flag stored in the internal memory of the system controller 50 or the memory 52 (step S277). If the guidance display permission flag is OFF, the guidance display processing is directly ended. On the other hand, if the guidance display permission flag is ON, guidance being displayed on the image display unit 28 or the notification unit 54 is hidden (step S278), and the guidance display processing is ended.

FIGS. 13A to 13D show exemplary guidance display in the second embodiment, exemplary display when the guidance display setting is ON being shown.

Figure 13A:
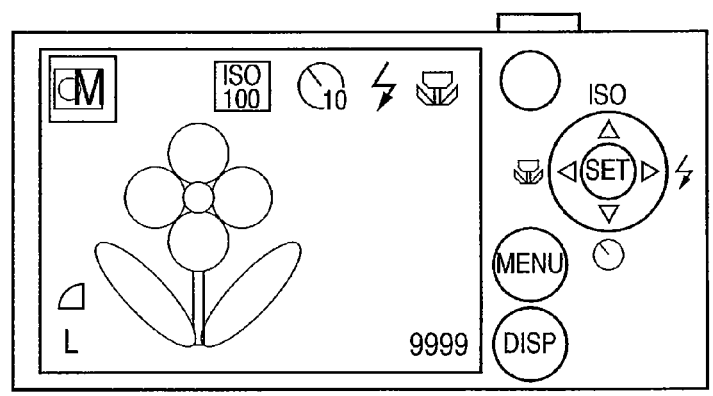
FIGS. 13A to 13D illustrate guidance display according to the second embodiment of the present invention.

FIG. 13A shows the normal state in shooting mode. Note that in this state, display is similar irrespective of the ON/OFF status of the guidance display setting and guidance display permission flags.

Figure 13B:
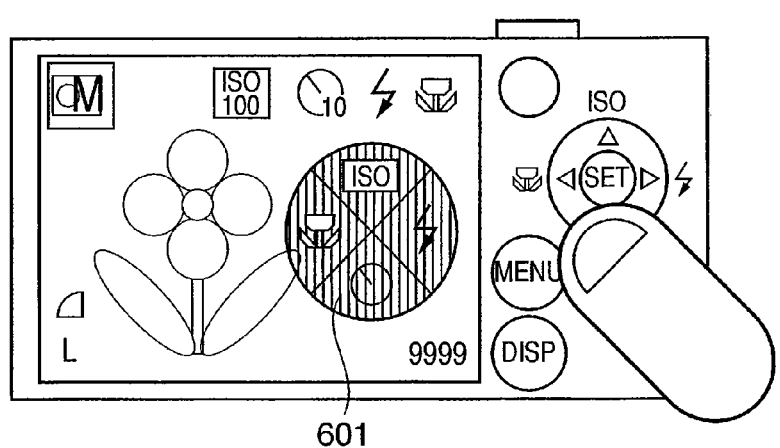

FIG. 13B shows what the screen looks like when the cross key is touched when both the guidance display setting and guidance display permission flags are ON. Icons 601 showing the ISO speed, single shot/sequential shot/self-timer setting, flash mode setting and macro/infinity setting assigned to the cross key are displayed as guidance when the cross key is touched.

Figure 13C:
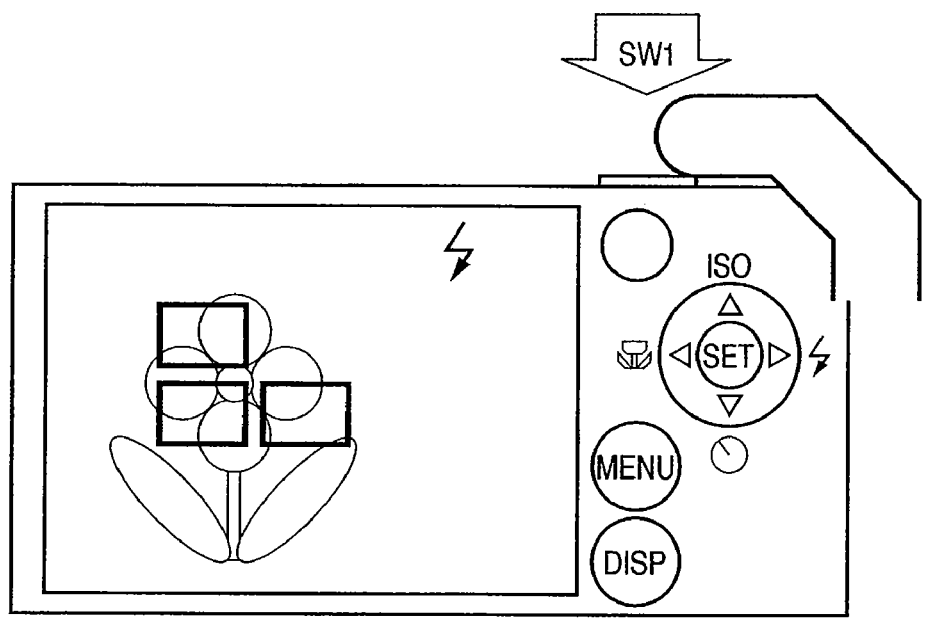

FIG. 13C shows what the screen looks like when the shutter switch SW1 is ON. AF is performed, and focus frames are displayed.

Figure 13D:
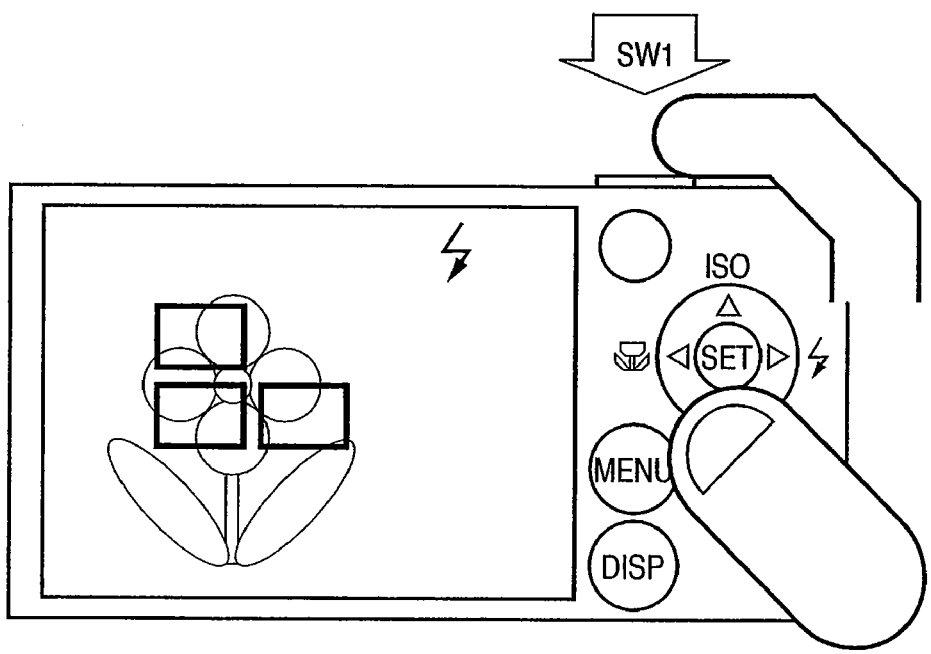

FIG. 13D shows what the screen looks like when the cross key is touched in this state (i.e., with the shutter switch SW1 ON). Guidance is not displayed even when the cross key is touched, since the guidance display permission flag is set to OFF when the shutter switch SW1 is ON, and is not set to ON until the shutter switch SW1 is released.

As seen above, guidance is not displayed in the second embodiment while the shutter switch SW1 is being pressed, even though the guidance display setting is ON. It is thereby possible to prevent unnecessary guidance from being displayed during image sensing operation and interfering with the image sensing operation.

Note that while the second embodiment is described in terms of the guidance display permission flag being set to OFF when the shutter switch SW1 is ON, display/non-display of guidance can be switched according to desired conditions by appropriately setting the conditions under which the guidance display permission flag is set to OFF, without being limited to when the shutter switch SW1 is ON.

Third Embodiment

A third embodiment of the present invention is described next.

In the third embodiment, operations to inhibit guidance display when the scene mode is in underwater mode are described.

It is conceivable that when the camera is placed in an underwater case for underwater use, touching to an operation member may be constantly detected due to the pressure of the case, resulting in guidance being mistakenly displayed despite the photographer not touching the operation member. Description is thus given in relation to preventing improper display by inhibiting guidance display when in underwater mode.

The processing of the image pickup apparatus 100 in the third embodiment differs from the second embodiment with respect to the processing performed when the mode dial 60 is set to shooting mode and playback mode in the above step S107 of FIG. 9 described in the second embodiment. Accordingly, processing when in shooting mode and playback mode is described with reference to FIGS. 14 and 15, respectively.

Figure 14:
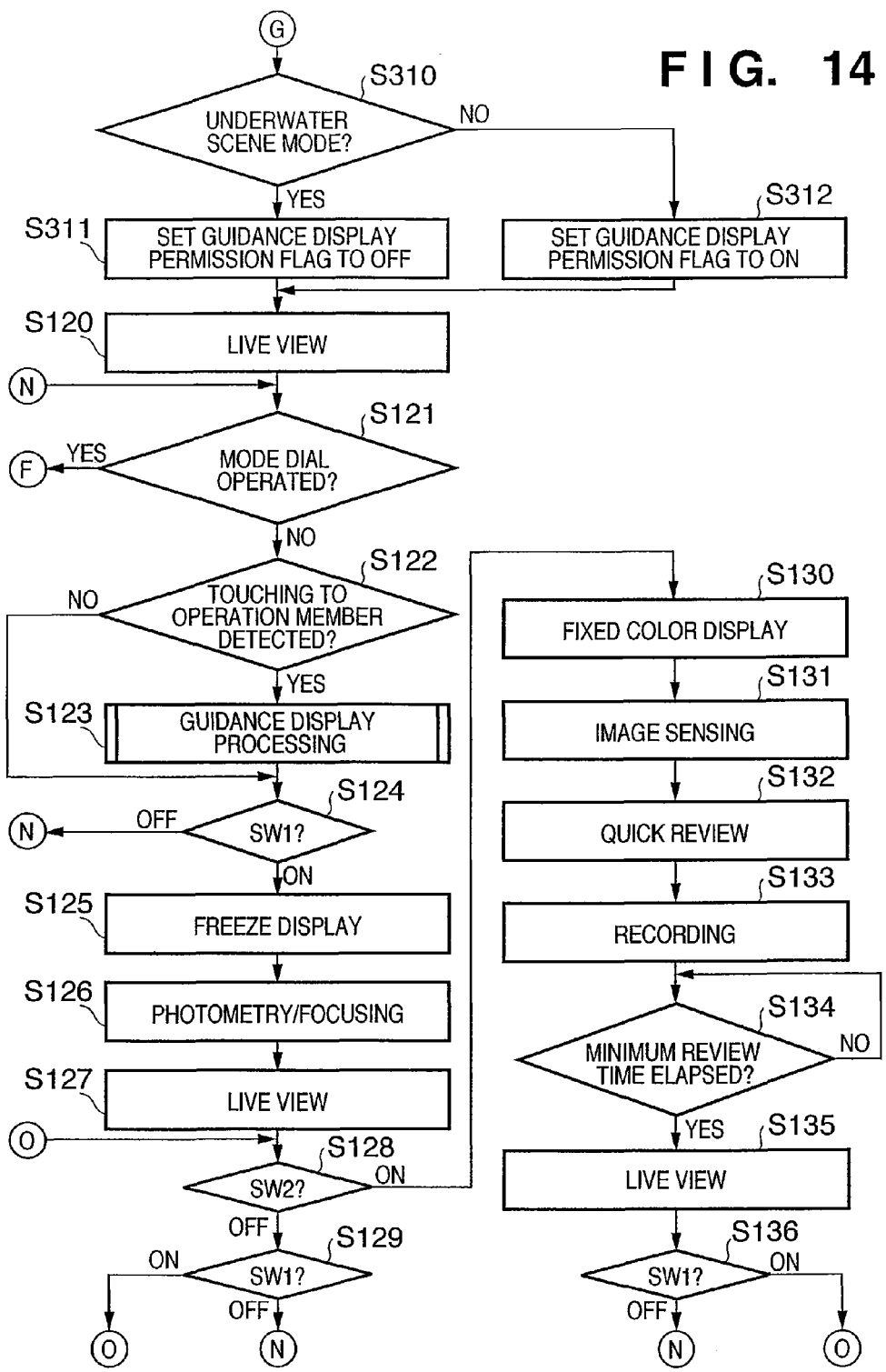
FIG. 14 is a flowchart showing part of the processing in shooting mode performed by the image pickup apparatus according to the third embodiment of the present invention.

In FIG. 14, the system controller 50 firstly determines the scene mode at step S310. If the scene mode is in underwater mode, the guidance display permission flag is set to OFF (step S311), and if the scene mode is not in underwater mode, the guidance display permission flag is set to ON (step S312). Next, at steps S120 to S136, the operations described with reference to FIG. 3 in the first embodiment are performed. With the guidance display processing of step S123 in the third embodiment, however, the processing described with reference to FIG. 12 in the second embodiment is performed.

Figure 15:
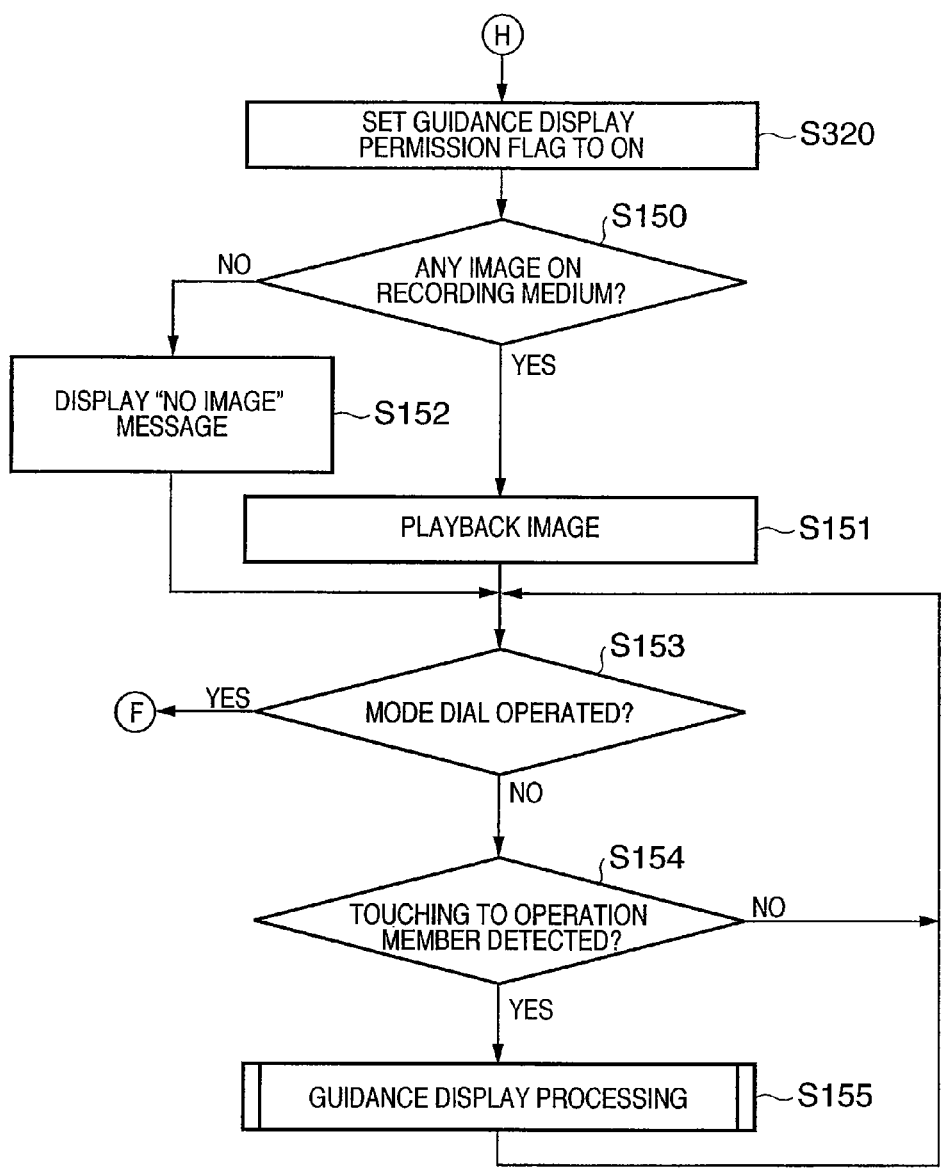
FIG. 15 is a flowchart showing part of the processing in playback mode performed by the image pickup apparatus according to the third embodiment of the present invention.

If the mode dial 60 is set to playback mode, the guidance display permission flag is set to ON in step S320 of FIG. 15. Next, at steps S150 to S155, the operations described with reference to FIG. 4 in the first embodiment are performed. With the guidance display processing of step S155 in the third embodiment, however, the processing described with reference to FIG. 12 in the second embodiment is performed.

By controlling the guidance display permission flag to be OFF when in underwater mode as described above, guidance display can be inhibited.

FIGS. 16A to 16D show exemplary guidance display in the third embodiment, exemplary display when the guidance display setting is ON being shown.

Figure 16A:
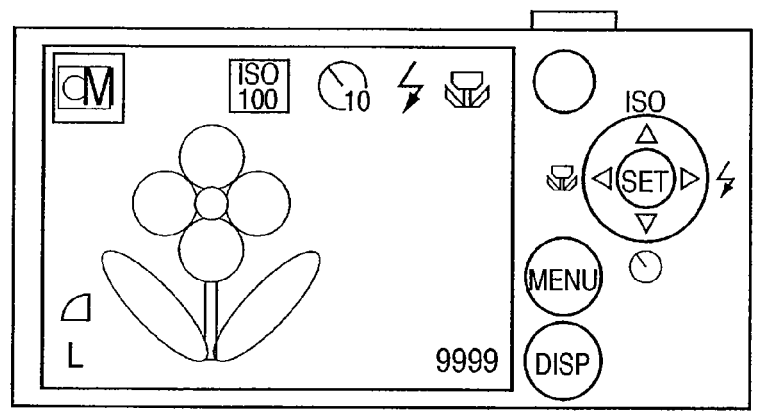
FIG. 16A to 16D illustrate guidance display according to the third embodiment of the present invention.

FIG. 16A shows the normal state in shooting mode. In this state, display is similar irrespective of the ON/OFF state of the guidance display and guidance display permission settings.

Figure 16B:
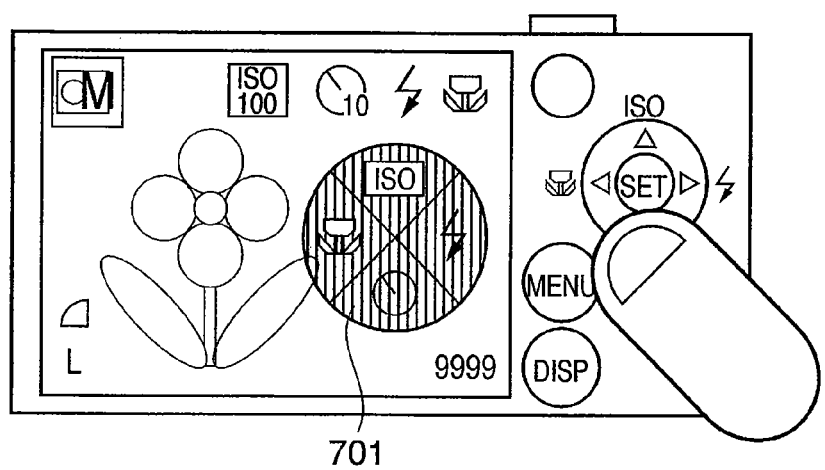

FIG. 16B shows what the screen looks like when the cross key is touched when both the guidance display setting and the guidance display permission flag are ON, with the scene mode in shooting mode not set to underwater. Icons 701 showing the ISO speed, single shot/sequential shot/self-timer setting, flash mode setting and macro/infinity setting assigned to the cross key are displayed as guidance when the cross key is touched.

Figure 16C:
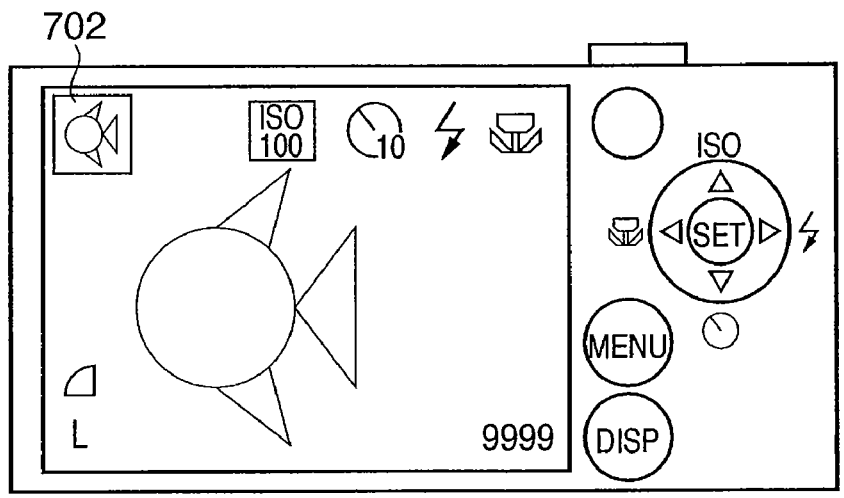

FIG. 16C shows the normal state when the scene mode in shooting mode is set to underwater. In this state, similar display is performed irrespective of the ON/OFF state of the guidance display and guidance display permission settings. In the FIG. 16C example, displaying an icon 702 showing underwater mode enables the user to know that underwater mode is set.

Figure 16D:
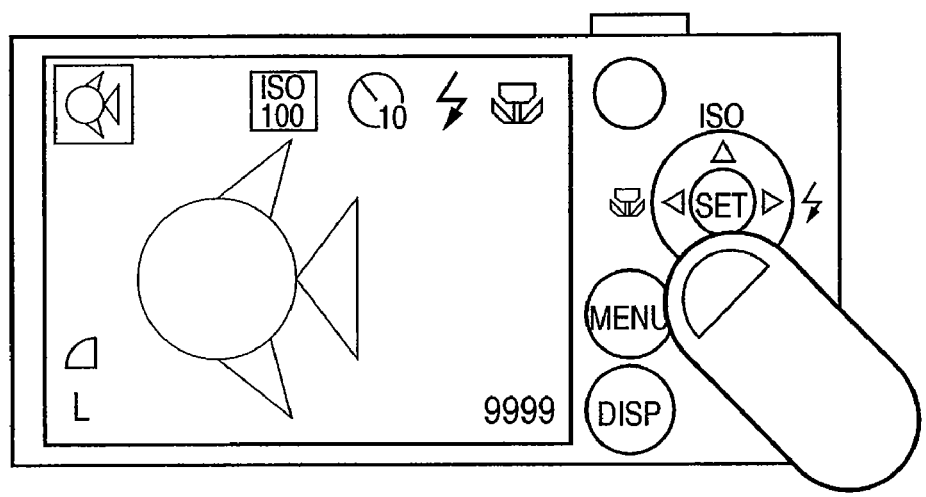

FIG. 16D shows what the screen looks like when the cross key is touched when the scene mode in shooting mode is set to underwater. Since the guidance display permission flag is set to OFF when the scene mode is set to underwater, guidance is not displayed even when the cross key is touched.

It is thereby possible to prevent improper display by inhibiting guidance display when in underwater mode.

Other Embodiments

The invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-038481, filed Feb. 15, 2006, which is hereby incorporated by reference herein in its entirety.

What is claimed is:

1. An image pickup apparatus comprising:
a display unit that displays a picked-up image;
an operation member to which a plurality of functions have been assigned;
a detection unit that detects touching to the operation member;
a setting unit that sets display or non-display of the functions assigned to said operation member in response to said detection unit detecting touching to said operation member;
a controller that controls,
    if touching to the operation member is detected by said detection unit and if display of the functions is set by said setting unit, to superimpose over the picked-up image on said display unit the functions assigned to said operation member in an operational state of the image pickup apparatus in response to the detection of the touching to the operation member, and
    if touching to the operation member is detected by said detection unit and if non-display of the functions is set by said setting unit, not to display on said display unit the functions assigned to said operation member; and
a determination unit that determines whether the image pickup apparatus is operating in an underwater shooting mode, wherein said controller further superimposes image pickup conditions currently set by operating the operation member over the picked-up image on said display unit, and if touching to said operation member is detected by said detection unit with non-display of the functions set by said setting unit, said controller does not display on said display unit the functions assigned to said operation member, and changes among the displayed currently set image pickup conditions, a display format of an image pickup condition changeable by operating said operation member so as to be noticeable from the rest of the settings without changing the image pickup condition itself, wherein said controller further controls to not to display the functions assigned to said operation member in an operational state of the image pickup apparatus if operation of a shutter switch is detected even if touching to said operation member is detected by said detection unit and display of the functions is set by said setting unit, and wherein said controller further controls to not to display the functions assigned to said operation member in an operational state of the image pickup apparatus if the determination unit determines that the image pickup apparatus is operating in the underwater shooting mode even if touching to said operation member is detected by said detection unit and display of the functions is set by said setting unit.

2. The image pickup apparatus according to claim 1, wherein said controller controls, if non-display of the functions is set by said setting unit, to further display on said display unit that non-display is set.

3. The image pickup apparatus according to claim 1, wherein the display format includes magnified display and different color display of the setting.

4. A display control method in an image pickup apparatus that has a display unit that displays a picked-up image, an operation member to which a plurality of functions are assigned, and a detection unit that detects touching to the operation member, the display control method being for the display unit, and comprising the steps of:

judging with use of the detection unit whether the operation member is touched;

setting display or non-display of the functions assigned to the operation member in response to detection of touching to the operation member;

superimposing over the picked-up image on the display unit, if touching to the operation member is detected and if display of the functions is set, the functions assigned to the operation member in an operational state of the image pickup apparatus in response to the detection of the touching to the operation member; and determining whether the image pickup apparatus operating in an underwater shooting mode, wherein if touching to the operation member is detected and if non-display of the functions is set, the functions assigned to the operation member are not displayed on the display unit, wherein if operation of a shutter switch is detected, the functions assigned to the operation member are not displayed on the display unit even if touching to said operation member is detected and display of the functions is set, and wherein if it is determined that the image pickup apparatus is operating in the underwater shooting mode, the functions assigned to said operation member in an operational state of the image pickup apparatus are not displayed even if touching to said operation member is detected and display of the functions is set;

superimposing image pickup conditions currently set by operating the operation member over the picked-up image on the display unit; and changing among the displayed currently set image pickup conditions, a display format of an image pickup condition changeable by operating the operation member so as to be noticeable from the rest of the settings without changing the image pickup condition itself and without displaying on the display unit the functions assigned to the operation member, if touching to the operation member is detected by the detection unit with non-display of the functions set in the setting step.

5. The display control method according to claim 4, further comprising a step of displaying on the display unit that non-display of the functions is set, if non-display of the functions is set in the setting step.

6. The display control method according to claim 4, wherein the display format includes magnified display and different color display of the setting.

7. A non-transitory storage medium, readable by a computer, that stores the computer program including instructions for controlling the computer to carry out the display control method of claim 4.

8. The image pickup apparatus according to claim 1, further comprising an execution unit configured to, if the operation member is pressed in a state where the display format of the image pickup condition changeable by operating said operation member is changed in response to touching to said operation member, execute the changing of the image pickup condition currently set.

9. The display control method according to claim 4, further comprising an execution step of, if the operation member is pressed in a state where the display format of the image pickup condition changeable by operating said operation member is changed in response to touching to said operation member, executing the changing of the image pickup condition currently set.

10. An image pickup apparatus comprising:

a display unit that displays a picked-up image;

an operation member to which a plurality of functions have been assigned;

a detection unit that detects touching to the operation member;

a setting unit that sets display or non-display of the functions assigned to said operation member in response to said detection unit detecting touching to said operation member; and a controller that controls, if touching to the operation member is detected by said detection unit and if display of the functions is set by said setting unit, to superimpose over the picked-up image on said display unit the functions assigned to said operation member in an operational state of the image pickup apparatus in response to the detection of the touching to the operation member, and if touching to the operation member is detected by said detection unit and if non-display of the functions is set by said setting unit, not to display on said display unit the functions assigned to said operation member, wherein said controller further superimposes image pickup conditions currently set by operating the operation member over the picked-up image on said display unit, and if touching to said operation member is detected by said detection unit with non-display of the functions set by said setting unit, said controller does not display on said display unit the functions assigned to said operation member, and changes among the displayed currently set image pickup conditions, a display format of an image pickup condition changeable by operating said operation member so as to be noticeable from the rest of the settings without changing the image pickup condition itself, and if touching to said operation member is detected by said detection unit with display of the functions set by said setting unit, said controller displays on said display unit the functions assigned to said operation member, and does not change among the displayed currently set image pickup conditions, a display format of an image pickup condition changeable by operating said operation member, wherein said controller further controls to not to display the functions assigned to said operation member in an operational state of the image pickup apparatus if operation of a shutter switch is detected even if touching to said operation member is detected by said detection unit and display of the functions is set by said setting unit, and wherein said controller does not change said image pickup condition changeable by operating said operation member even if touching to said operation member is detected, and changes said image pickup condition if said operation member is operated.

11. A display control method in an image pickup apparatus that has a display unit that displays a picked-up image, an operation member to which a plurality of functions are assigned, and a detection unit that detects touching to the operation member, the display control method being for the display unit, and comprising the steps of:

judging with use of the detection unit whether the operation member is touched;

setting display or non-display of the functions assigned to the operation member in response to detection of touching to the operation member;

superimposing over the picked-up image on the display unit, if touching to the operation member is detected and if display of the functions is set, the functions assigned to the operation member in an operational state of the image pickup apparatus in response to the detection of the touching to the operation member, wherein if touching to the operation member is detected and if non-display of the functions is set, the functions assigned to the operation member are not displayed on the display unit, and wherein if operation of a shutter switch is detected, the functions assigned to the operation member are not displayed on the display unit even if touching to said operation member is detected and display of the functions is set;

superimposing image pickup conditions currently set by operating the operation member over the picked-up image on the display unit; and changing among the displayed currently set image pickup conditions, a display format of an image pickup condition changeable by operating the operation member so as to be noticeable from the rest of the settings without changing the image pickup condition itself and without displaying on the display unit the functions assigned to the operation member, if touching to the operation member is detected by the detection unit with non-display of the functions set in the setting step, and not changing among the displayed currently set image pickup conditions, a display format of an image pickup condition changeable by operating the operation member and with displaying on said display unit the functions assigned to said operation member, if touching to the operation member is detected by said detection unit with display of the functions set by said setting unit, and not changing the image pickup condition changeable by operating the operation member even if touching to said operation member is detected, and changing the image pickup condition if the operation member is operated.

12. A non-transitory storage medium, readable by a computer, that stores the computer program including instructions for controlling the computer to carry out the display control method of claim 11.

\* \* \* \* \*